United States Patent [19]

Makino et al.

[11] Patent Number: 4,612,271
[45] Date of Patent: Sep. 16, 1986

[54] PHOTOSENSITIVE COMPOSITION COMPRISING AZO COMPOUNDS

[75] Inventors: Naonori Makino; Seiji Horie; Hideo Sato, all of Kanagawa, Japan

[73] Assignee: Fuji Photo Film Co., Ltd., Kanagawa, Japan

[21] Appl. No.: 811,134

[22] Filed: Dec. 19, 1985

[30] Foreign Application Priority Data

Dec. 21, 1984 [JP] Japan .................................. 59-270310
Apr. 15, 1985 [JP] Japan .................................. 60-80025

[51] Int. Cl.⁴ .............................................. G03G 5/06
[52] U.S. Cl. ........................................ 430/72; 430/73; 430/74; 430/76; 430/77
[58] Field of Search ....................... 430/72, 73, 74, 76, 430/77, 78

[56] References Cited
U.S. PATENT DOCUMENTS
4,507,471 3/1985 Ohta ........................................ 430/72

Primary Examiner—John D. Welsh
Attorney, Agent, or Firm—Sughrue, Mion, Zinn, Macpeak, and Seas

[57] ABSTRACT

A photosensitive composition is provided comprising at least one azo compound represented by formula (1)

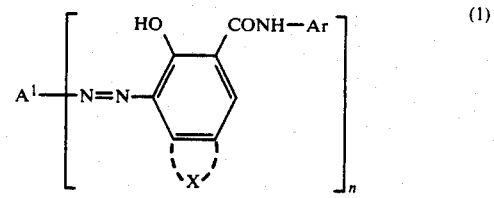

wherein $A^1$ represents a substituted or unsubstituted carbocyclic or heterocyclic aromatic ring; X represents an atomic group forming a substituted or unsubstituted carbocyclic or heterocyclic aromatic ring upon condensation with benzene rings; Ar represents a carbocyclic or heterocyclic aromatic ring substituted by at least one perfluoroalkyl group (groups other than perfluoroalkyl group may also be present); and n represents an integer of 3, 4, 5, or 6.

10 Claims, No Drawings

PHOTOSENSITIVE COMPOSITION COMPRISING AZO COMPOUNDS

FIELD OF THE INVENTION

The present invention relates to a photoconductive composition containing certain azo compounds substituted by a perfluoroalkyl group. More particularly, the present invention relates to a heat mode optical data recording medium which develops changes upon exposure to high density energy beams to record and reproduce data.

BACKGROUND OF THE INVENTION

As disclosed in U.S. Pat. No. 2,297,691 to Carlson, an electrophotographic process employs a photosensitive material comprising a substrate which has been coated in a dark room with an insulating material which changes its electrical resistance depending on the amount of irradiation during imagewise exposure. Such a photosensitive material is generally given a uniform surface electrical charge after being adapted to darkness for a suitable period of time. The material is then exposed to a desired image by an irradiation pattern which has an effect of reducing surface electrical charge depending on relative energy contained in various portions of the irradiation pattern. The surface electrical charge or static latent image thus left behind on the surface of the photoconductive material layer (electrophotographic photosensitive layer) is then brought into contact with a suitable electroscopic displaying substance or toner to develop a visible image.

Such a toner may be contained in either an insulating liquid or dry carrier. In either case, the toner may be attached to the surface of an electrophotographic photosensitive layer in accordance with an electrical charge pattern. The displaying substance thus attached may be fixed to the layer by a known means such as heat, pressure, and solvent vapor. The static latent image may be transferred to a second substrate (e.g., paper and film). Accordingly, the static latent image may be developed on such a second substrate.

Principle requirements in an electrophotographic process include that (1) the photoconductive material can be charged with a desired potential in a dark room, (2) the dissipation of electrical charge in a dark room is negligibly small, and (3) the electrical charge can be rapidly dissipated upon light irradiation.

Heretofore, photoconductive materials for electrophotographic photosensitive material that have been employed include selenium, cadmium sulfide, and zinc oxide.

It is known that these inorganic materials have many advantages but, at the same time, have many disadvantages. For example, selenium, which is now widely used, satisfies the above requirements but is disadvantageous in that its complex production conditions entail high production costs. This material is also disadvantageous in that its poor flexibility makes it difficult to be worked into a belt-shaped form, and its high susceptibility to heat and mechanical impact requires careful handling. Cadmium sulfide or zinc oxide is dispersed in a binder such as a resin to be used as an electrophotographic photosensitive material. However, such an electrophotographic photosensitive material is disadvantageous in mechanical properties such as smoothness, rigidity, tensile strength, and abrasion resistance, and thus cannot sufficiently repeatedly be used in its heretofore known embodiments.

In recent years, electrophotographic photosensitive materials employing various organic materials have been proposed and put into practical use to eliminate these problems of inorganic materials. These electrophotographic photosensitive materials include an electrophotographic photosensitive material made of poly-N-vinylcarbazole and 2,4,7-trinitrofluorene (see U.S. Pat. No. 3,484,237), an electrophotographic photosensitive material which comprises poly-N-vinylcarbazole sensitized with a pyrylium salt dye (see Japanese patent publication No. 25658/73), an electrophotographic photosensitive material mainly comprising an organic pigment (see Japanese patent application (OPI) No. 37543/72 (the term "OPI" as used herein refers to a "published unexamined Japanese patent application")), and an electrophotographic photosensitive material mainly comprising an eutectic complex made of a dye and a resin (see Japanese patent application (OPI) No. 10735/72).

If a proper binder is selected, an electrophotographic photosensitive material employing such an organic material can be applied to a substrate by a coating method. Therefore, such an electrophotographic photosensitive material provides an extremely high productivity, providing an inexpensive photosensitive material. Such an electrophotographic photosensitive material has improved mechanical properties and flexibility. Furthermore, when a dye and an organic pigment are properly selected, the photosensitive wavelength can freely be controlled.

However, these electrophotographic photosensitive materials cannot fully meet requirements for electrophotographic photosensitive material because of various disadvantages. These disadvantages include that (1) they are low in photosensitivity, (2) the higher photosensitivity is, the poorer is chargeability, (3) the higher photosensitivity is, the higher is electrical charge dissipation in a dark room (dark decay), (4) when repeatedly used, they show large fluctuations in properties such as photosensitivity, chargeability, and dark decay, and (5) an inorganic pigment cannot be easily dispersed in the material, resulting in a poor coated surface.

Heretofore, the method for recording data on a data recording medium by irradiating high energy density beams thereonto so that the physical properties such as transmittance, reflectance, and refractive index thereof are changed has been used for COM (computer output micro), microfacsimile, printing plates, and optical discs, because it is advantageous in that it can produce images of extremely high resolution and contrast, enables addition of data, and can simultaneously record data upon exposure to light, thus making it possible to be used for recording of output of computers or time series signals transmitted.

For example, a recording medium used in an optical disc technique enables high density recording of data by recording pits of about 1 $\mu$m in diameter in the form of a spiral or circular tracks. In order to write data into such a disc, a laser beam converged onto the surface of a laser-sensitive layer is scanned so that the surface thus irradiated forms pits. These pits are arranged in the form of spiral or circular tracks. In the heat mode recording process, a laser-sensitive layer absorbs heat energy and forms small indentations (pits) by evaporation or melting upon irradiation of laser beams.

The data thus recorded on the optical disc is detected by scanning laser beams along the track and reading optical changes caused by the difference between portions having pits and portions free of pits.

Heretofore, as such a data recording medium which enables heat mode recording, there have been employed a recording medium which comprises a transparent substrate such as plastic on which a thin film made of a metal and/or metal oxide semimetal dielectric substance or a thin film containing a self-oxidizing binder and a dye is provided as a recording layer, over which a protective layer is provided.

However, such prior art thin film mainly comprising an inorganic material is disadvantageous in that its high reflectance to laser beams entails a low efficiency of use of laser beams, making it difficult to obtain high sensitivity, or requiring a remarkably increased output of the laser beam for data recording.

On the other hand, the use of organic material is generally disadvantageous in that its absorption property becomes unstable toward longer wavelength regions, i.e., 600 nm or longer, and it is thus susceptible to decay by a slight change in temperature in this region.

Therefore, no recording medium has yet been developed which contains an organic thin film which fully satisfies various practical requirements for a recording medium having a capability for "direct read and write". These requirements include that its absorption efficiency to laser beams used must be high, that its reflectance is such that the focus control upon data reading can be properly made, and that various properties such as stability of recorded images are achieved.

SUMMARY OF THE INVENTION

It is therefore an object of the present invention to provide a photoconductive composition which can be applied to various photoconductive materials.

It is another object of the present invention to provide an electrophotographic photosensitive material having a high photosensitivity and a stable potential upon repeated use.

It is still another object of the present invention to provide an optical data recording medium having an excellent shelf life, high photosensitivity, and a high S/N (signal/noise) ratio.

These and other objects of the present invention will become more apparent from the following detailed description and examples.

As a result of extensive studies to solve the above-described problems, the inventors have now found that an electrophotographic photosensitive material employing a photoconductive composition containing an azo compound substituted by a perfluoroalkyl group can overcome all of the above problems of organic electrophotographic photosensitive materials. Thus, the inventors have attained the present invention.

Thus, the objects of the present invention are accomplished with a photosensitive composition comprising at least an azo compound represented by formula (1)

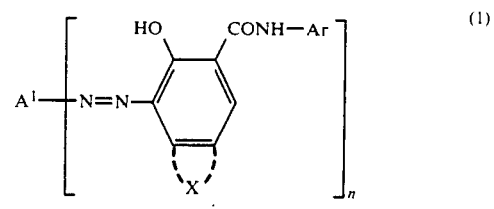

wherein $A^1$ represents a substituted or unsubstituted carbocyclic or heterocyclic aromatic ring; X represents an atomic group forming a substituted or unsubstituted carbocyclic or heterocyclic aromatic ring upon condensation with benzene rings; Ar represents a carbocyclic or heterocyclic aromatic ring substituted by at least one perfluoroalkyl group (groups other than perfluoroalkyl group may also be present); and n represents an integer of 3, 4, 5, or 6.

The electrophotographic photosensitive material of the present invention has an extremely high photosensitivity, excellent chargeability, shows only small changes in properties upon repeated use, and provides an excellent coated surface.

DETAILED DESCRIPTION OF THE INVENTION

Examples of $A^1$ in formula (1) include aromatic carbocyclic rings such as benzene, naphthaleneanthracene, pyrene, and anthraquinone, polynuclear quinone aromatic rings such as anthrone, heterocyclic aromatic rings such as furan, thiophene, pyridine, benzoxazole, benzothiazole, carbazole, and phthalocyanine, and compounds comprising the above aromatic rings bonded to each other directly or by aromatic or non-aromatic groups, such as triphenyloxazole, triphenylthiazole, triphenylimidazole, triphenylselenazole, triphenylamine, triphenylmethane, triphenylpyridine, triphenyltriazole, and tetraphenylthiophene.

Examples of the substituting groups for these rings include $C_{1-6}$ (i.e., having from 1 to 6 carbon atoms) lower alkyl groups such as methyl group and ethyl group, $C_{1-6}$ lower alkoxy group such as methoxy group and ethoxy group, $C_{1-6}$ lower haloalkyl groups such as chloromethyl group, fluoromethyl group, and trifluoromethyl group, dialkylamino groups having two $C_{1-6}$ alkyl groups, such as dimethylamino group and diethylamino group, halogen atoms such as fluorine atom, chlorine atom, and bromine atom, hydroxy groups, nitro groups, and cyano groups. These rings may be bonded to each other by 1 to 4 substituting groups. If a plurality of substituting groups are used, these substituting groups may be the same or different from each other. Alternatively, any combination of these substituting groups may be used. These substituting groups may be present in any position.

X is a group which can form an aromatic ring such as naphthalene ring and anthracene ring or a heterocyclic ring such as indole ring, carbazole ring, benzocarbazole ring, and dibenzofuran ring upon condensation with benzene rings to which hydroxy groups are bonded.

If X is an aromatic ring or heterocyclic ring having substituting groups, examples of these substituting groups may include the same substituting groups as described for $A^1$. In this case, from 1 to 5 substituting groups may be present. If a plurality of substituting groups are used, these substituting groups may be the same or different from each other. Alternatively, any combination of these substituting groups may be used. These substituting groups may be present in any position.

Examples of perfluoroalkyl groups for substituting Ar include $C_{1-12}$ perfluoroalkyl groups such as trifluoromethyl group, pentafluoroethyl group, perfluorobutyl group, and perfluorohexyl group.

Examples of Ar include aromatic carbocyclic rings such as benzene, naphthalene, anthracene, and pyrene, and heterocyclic aromatic rings such as furan, thiophene, pyridineoxazole, thiazole, benzoxazole, benzothiazole, and carbazole.

If Ar is further substituted by substituting groups other than perfluoroalkyl group, examples of such substituting groups include hydroxy groups, cyano groups, nitro groups, halogen atoms such as fluorine atom, chlorine atom, and bromine atom, $C_{1-12}$ alkyl groups such as methyl group, ethyl group, propyl group, and isopropyl group, $C_{1-12}$ alkoxy groups such as methoxy group, ethoxy group, propoxy group, butoxy group, pentyloxy group, isopropoxy group, isobutoxy group, isoamyloxy group, tert-butoxy group, and neopentyloxy group, amino groups, $C_{1-12}$ alkylamino groups such as methylamino group, ethylamino group, and propylamino group, $C_{1-12}$ dialkylamino groups such as dimethylamino group, diethylamino group, and N-methyl-N-ethylamino group, $C_{6-12}$ arylamino groups such as phenylamino group and tolylamino group, diarylamino groups having two $C_{6-15}$ aryl groups, such as diphenylamino group, carboxyl groups, alkali metal carboxylate groups such as carboxylates of $Na^+$, $K^+$, and $Li^+$, alkali metal sulfonate groups such as sulfonates of $Na^+$, $K^+$ and $Li^+$, alkylcarbonyl groups such as acetyl group, propionyl group, and benzylcarbonyl group, arylcarbonyl groups having $C_{6-12}$ aryl groups, such as benzoyl group and toluoyl group, $C_{1-12}$ alkylthio groups such as methylthio group and ethylthio group, and $C_{1-12}$ arylthio groups such as phenylthio group and tolylthio group. In this case, 1 to 3 substituting groups may be used. If a plurality of substituting groups are used, these substituting groups may be the same or different from each other. Any combination of these substituting groups may be used. These substituting groups may be present in any position. In particular, Ar preferably includes halogen atoms besides perfluoroalkyl groups.

n represents an integer of 3, 4, 5, or 6, but is preferably 3 or 4.

Preferred compounds among azo compounds of formula (1) of the present invention are a trisazo compound of formula (2) and a tetrakisazo compound of formula (3) because these compounds can provide a photoconductive composition having a high photosensitivity, can provide an electrophotographic photosensitive material having a high photosensitivity and excellent durability, and can easily be prepared at low cost from raw materials which can be easily obtained. However, the azo compounds of the present invention is not limited to the compounds of formulae (2) and (3).

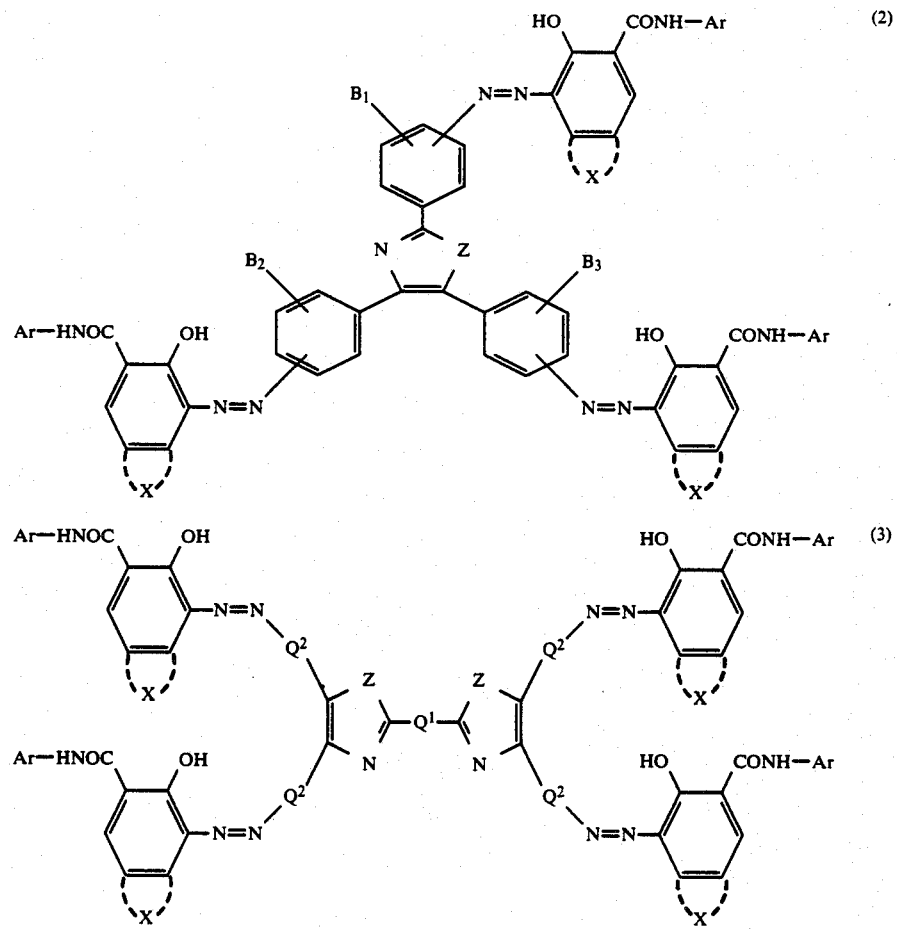

Examples of Ar and X used in formula (2) may include the same groups as used in formula (1).

Examples of $B^1$, $B^2$, and $B^3$ used in formula (2) may include the same substituting groups as used in $A^1$. In this case, $B^1$, $B^2$, and $B^3$ can be used in the number of from 1 to 4. If a plurality of these groups are used, these groups may be the same or different from each other. Alternatively, any combination of these groups may be used. These groups may be present in any position.

Z in formula (2) represents $>N-R^1$, $-O-$, $-S-$, or $-Se-$.

Examples of $R^1$ include $C_{1-6}$ alkyl groups, $C_{6-20}$ aryl groups, alkoxycarbonyl groups having $C_{1-12}$ alkoxy groups, $C_{6-20}$ aryloxycarbonyl groups, and $C_{1-20}$ acyl groups.

If $R^1$ is an unsubstituted alkyl group, examples thereof include methyl group, ethyl group, propyl group, butyl group, pentyl group, hexyl group, isopropyl group, isobutyl group, isohexyl group, neopentyl group, and tert-butyl group.

If $R^1$ is a substituted alkyl group, examples of such substituting groups include hydroxy groups, $C_{1-12}$ alkoxy groups, cyano groups, $C_{1-8}$ alkylamino groups, dialkylamino groups having two $C_{1-8}$ alkyl groups, halogen atoms, and $C_{6-15}$ aryl groups. These groups include hydroxyalkyl groups (e.g., hydroxymethyl group, 2hydroxyethyl group, 3-hydroxypropyl group, and 2-hydroxypropyl group), alkoxyalkyl groups (e.g., methoxyethyl group, 2-methoxyethyl group, 3-methoxypropyl group, ethoxymethyl group, and 2-ethoxyethyl group), cyanoalkyl groups (e.g., cyanomethyl group, and 2-cyanoethyl group), (alkylamino)alkyl groups (e.g., (methylamino)methyl group, 2-(methylamino)ethyl group, and (ethylamino)methyl group), (dialkylamino)alkyl group (e.g., (dimethylamino)methyl group, and 2-(dimethylamino)ethyl group), halogenoalkyl groups (e.g., fluoromethyl group, chloromethyl group, and bromomethyl group), and aralkyl groups (e.g., benzyl group, and phenethyl group).

If $R^1$ is an unsubstituted alkoxycarbonyl group, examples of such groups include methoxycarbonyl group, ethoxycarbonyl group, propoxycarbonyl group, butoxycarbonyl group, and benzyloxycarbonyl group.

If $R^1$ is an unsubstituted aryl group or unsubstituted aryloxycarbonyl group, examples of such groups include phenyl group, naphthyl group, pyridyl group, phenoxycarbonyl group, and naphthoxycarbonyl group.

If $R^1$ is an unsubstituted acyl group, examples of such groups may include acetyl group, propionyl group, benzoyl group, naphthoyl group, and nicotinoyl group.

If $R^1$ is a substituted alkoxycarbonyl group, substituted aryloxycarbonyl group, or substituted acyl group, examples of such substituting groups may include the same substituting groups as those used for the substituted alkyl group in $R^6$. In this case, from 1 to 3 such substituting groups may be present. If a plurality of such substituting groups are used, these substituting groups may be the same or different from each other. Any combination of these substituting groups may be used. These substituting groups may be present in any position.

Examples of Ar and X in formula (3) may include the same groups as used in formula (1).

Examples of Z in formula (3) may include the same groups as used in formula (2).

$Q^1$ represents a single bond,

(in which n represents an integer of from 1 to 3) or a divalent organic residue group having aromatic property.

$B^4$ and $B^5$ used in the above examples each represents a hydrogen atom or electron withdrawing group. Examples of such an electron attracting group include halogen atoms such as fluorine atom, chlorine atom, and bromine atom, nitro groups, cyano groups, and alkoxycarbonyl groups such as methoxycarbonyl group and ethoxycarbonyl group.

Examples of the divalent organic residual groups of the present invention include divalent organic residual groups and substituted compounds thereof shown below. Also as $R^1$ in the following examples, there may be present the same groups as are present in formula (2). Examples of substituting groups for such substituted compounds include the same substituting groups as described for $A^1$.

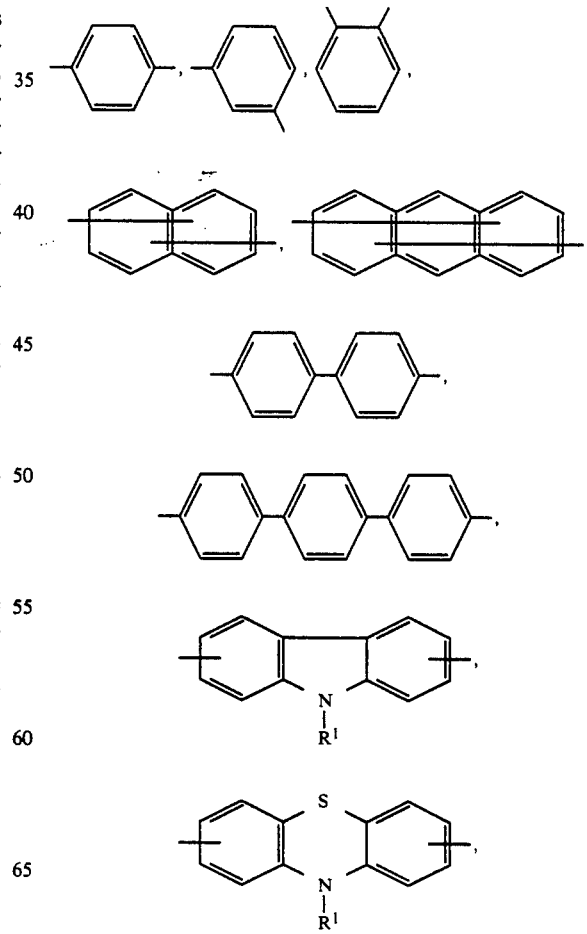

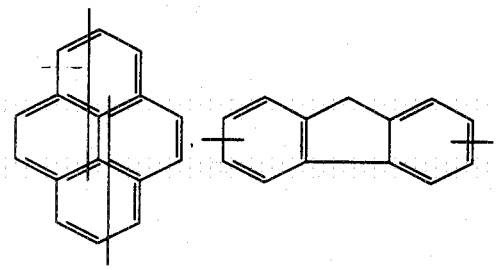

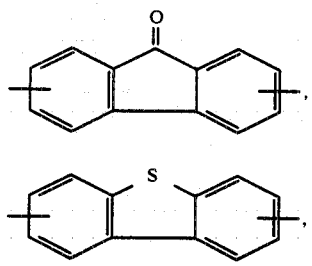

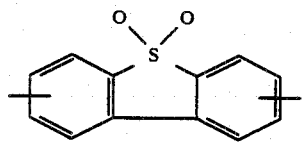

Q2 used in the above example represents a divalent aromatic carbon ring, divalent aromatic heterocyclic group, or substituted compounds thereof. Examples of such compounds include divalent aromatic carbon rings of formulae as shown below, or substituted compounds thereof.

As substituting groups for such substituted compounds there may be used the same substituting groups as described for $A^1$.

In addition to the trisazo compounds of formula (2) there may be usefully employed trisazo compounds of formula (4).

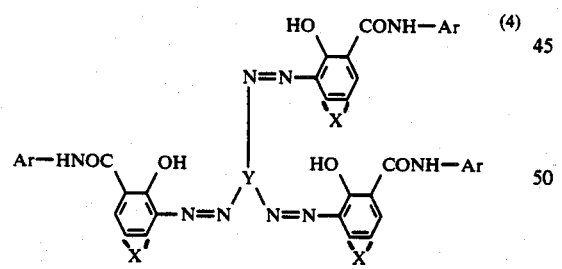
(4)

Y used in formula (4) represents a compound of the following formulae

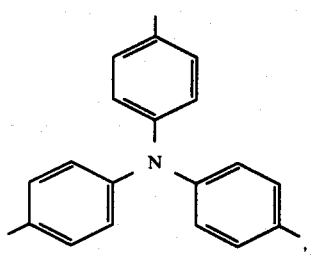

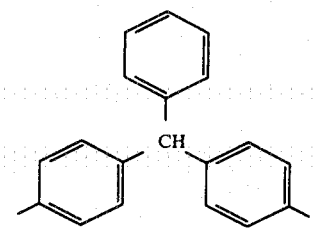

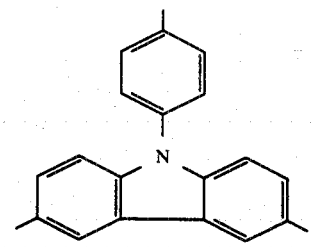

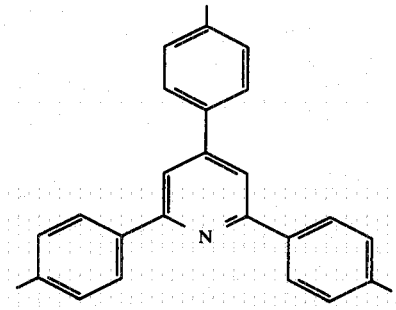

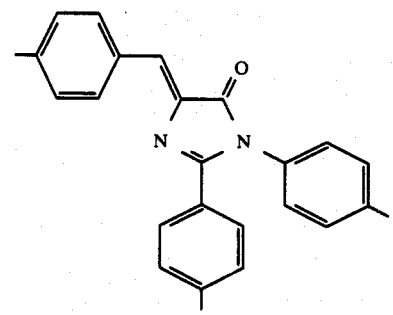

or

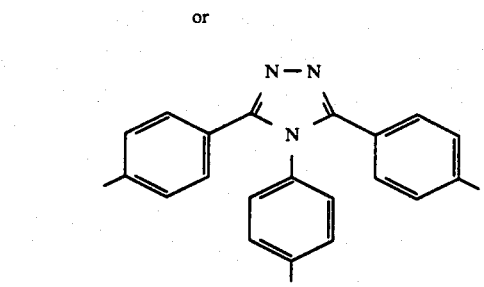

X and Ar used in formula (4) are the same as defined in formula (2).

Although the trisazo compounds that can be used according to the present invention are not particularly limited, preferred trisazo compounds among the trisazo compounds of formula (2) are those represented by formula (5).

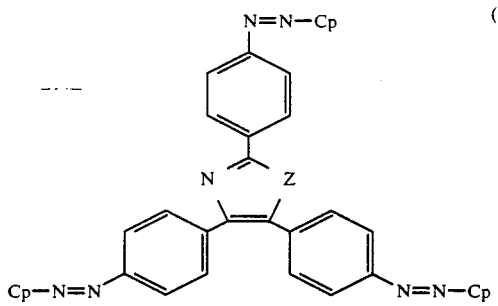

(5)

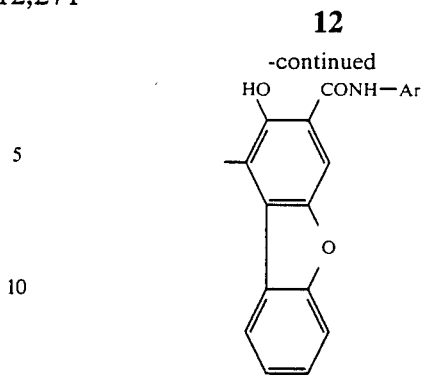

In formula (5), Z is the same as defined in formula (2); and Cp represents a coupler residue group which is preferably

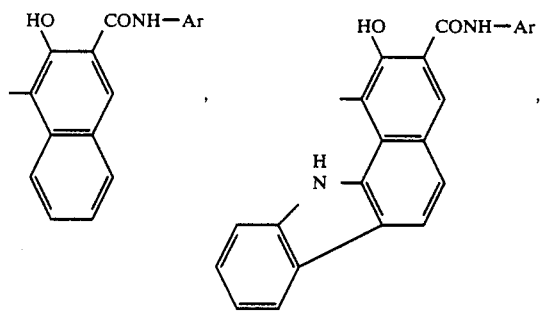

Ar in the above formulae is as defined in formula (1) and preferably represents benzene or naphthalene.

As a perfluoroalkyl group substituent on Ar, a trifluoromethyl group is preferably employed, and if Ar is substituted by substituent groups other than perfluoroalkyl groups, there may be preferably employed halogen atoms such as fluorine atoms, chlorine atoms, and bromine atoms.

Preferred trisazo compounds among the trisazo compounds of formula (3) are those represented by formula (6) shown below.

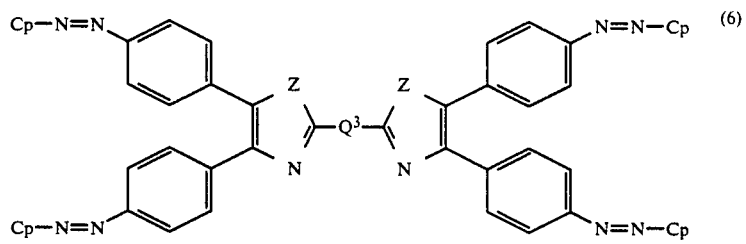

(6)

In formula (6), Z is as defined in formula (2); $Q^3$ represents a single bond, —HC═CH—,

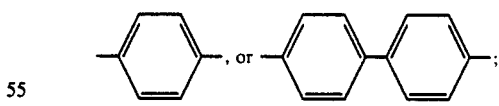

and Cp is the same as defined above.

Examples of azo compounds of formula (1) may include those represented by the following formulae. However, the azo compounds that can be used according to the present invention are not limited to those azo compounds. For simplification, it is designated that such azo compounds are represented by the formula $A^1$—[N═N—Cp]$_n$ The structure and substitution position(s) of $A^1$ are shown below:

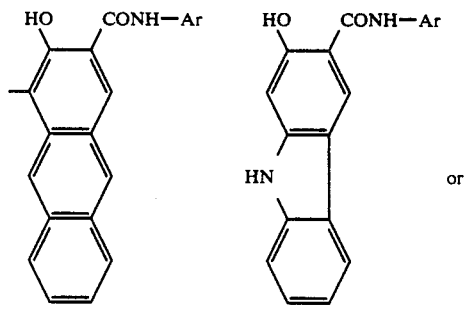 or

| Compound No. | $A^1$ |
|---|---|
| 1. | 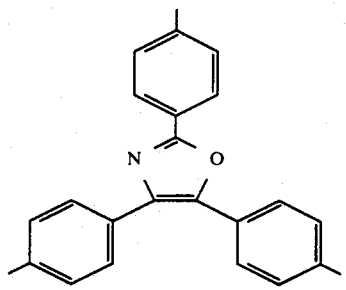 |
| 2. | 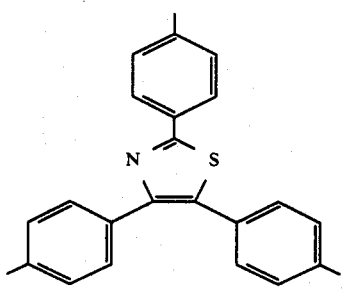 |
| 3. | 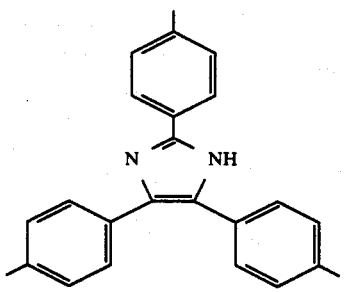 |
| 4. | 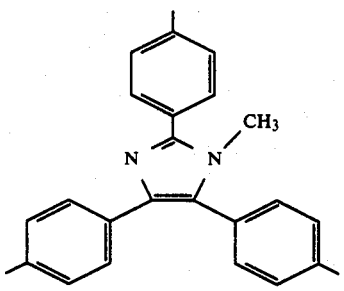 |
| 5. | 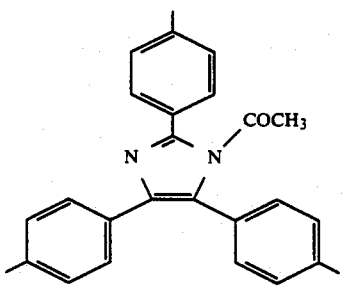 |

| Compound No. | A¹ |
|---|---|
| 6. | 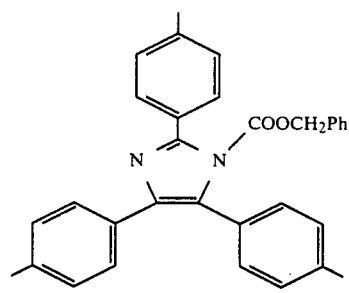 |
| 7. | 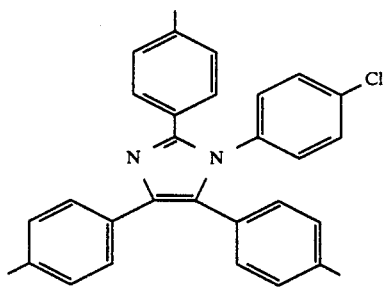 |
| 8. | 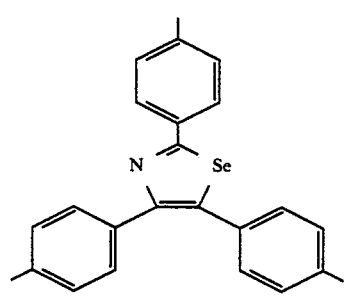 |
| 9. | 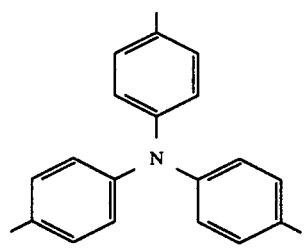 |
| 10. | 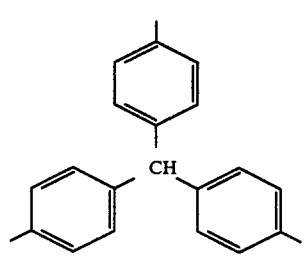 |

-continued
| Compound No. | A¹ |
|---|---|
| 11. | 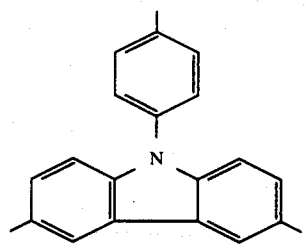 |
| 12. | 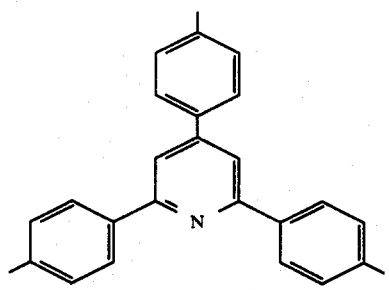 |
| 13. | 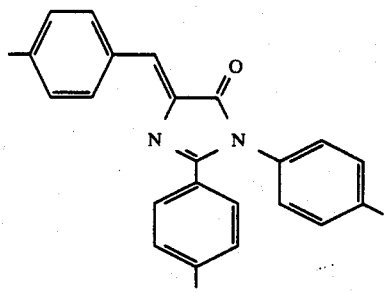 |
| 14 | 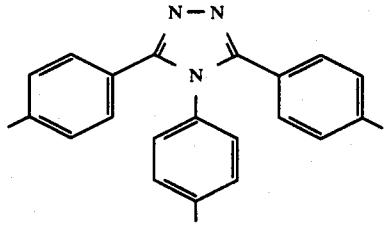 |
| 15. | 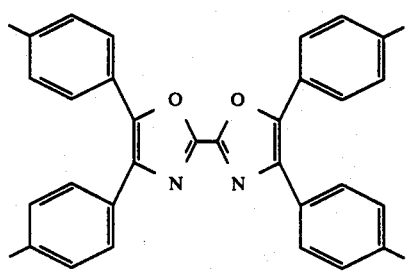 |

-continued

| Compound No. | A¹ |
| --- | --- |
| 16. | (structure) |
| 17. | (structure) |
| 18. | (structure) |
| 19. | (structure) |
| 20. | (structure) |

-continued
| Compound No. | $A^1$ |
|---|---|
| 21. | 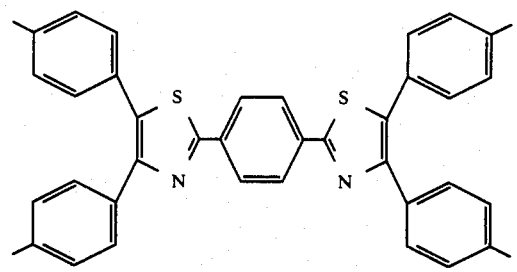 |
| 22. | 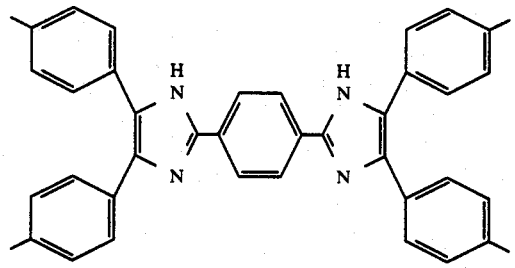 |
| 23. | 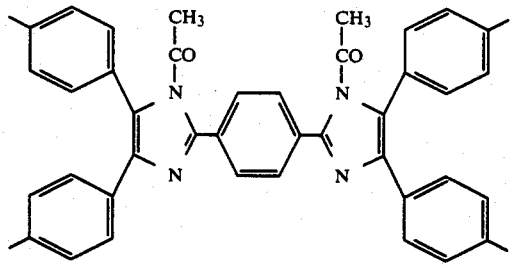 |
| 24. | 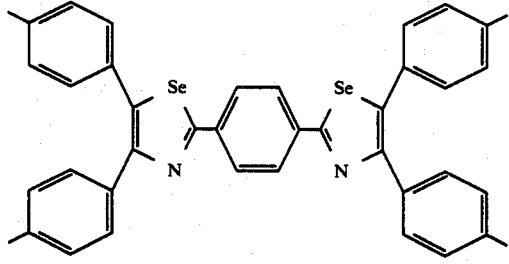 |
| 25. | 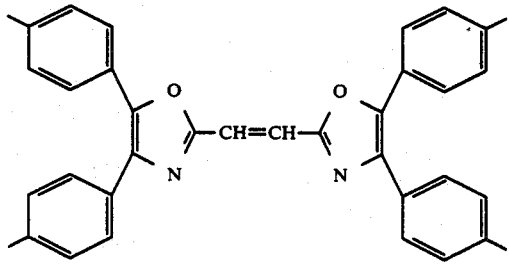 |

-continued
| Compound No. | $A^1$ |
|---|---|
| 26. | 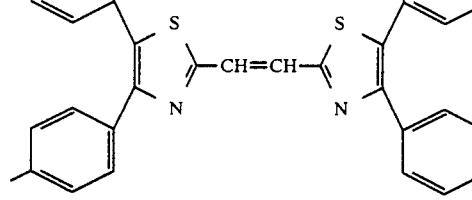 |
| 27. | 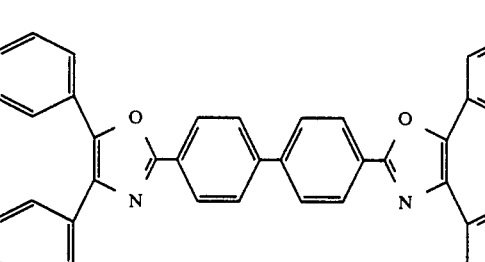 |
| 28. | 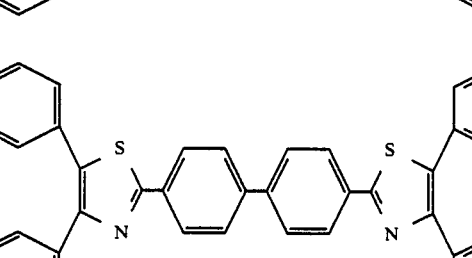 |
| 29. | 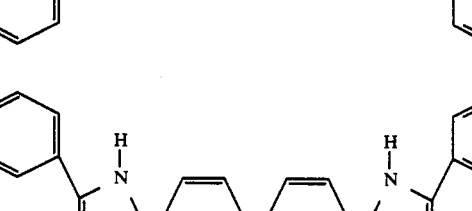 |
(i) n = 3 (trisazo compound)
(ii) n = 4 (tetrakisazo compound)
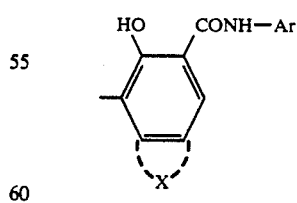
Examples of Cp include coupler residue groups shown in Table 1. Table 1 shows combinations of and Ar. The numerical symbols in Table 1 show the coupler number.

TABLE 1

| Ar | HO-[naphthalene]-CONH-Ar | HO-[aminonaphthalene]-CONH-Ar | HO-[anthracene]-CONH-Ar | HO-[carbazole]-CONH-Ar | HO-[dibenzofuran]-CONH-Ar |
|---|---|---|---|---|---|
| 2-CF₃-C₆H₄- | Cp-1 | Cp-13 | Cp-25 | Cp-37 | Cp-49 |
| 3-CF₃-C₆H₄- | Cp-2 | Cp-14 | Cp-26 | Cp-38 | Cp-50 |
| 4-CF₃-C₆H₄- | Cp-3 | Cp-15 | Cp-27 | Cp-39 | Cp-51 |
| 3,5-(CF₃)₂-C₆H₃- | Cp-4 | Cp-16 | Cp-28 | Cp-40 | Cp-52 |
| 4-Cl-2-CF₃-C₆H₃- | Cp-5 | Cp-17 | Cp-29 | Cp-41 | Cp-53 |
| 2-Cl-4-CF₃-C₆H₃- | Cp-6 | Cp-18 | Cp-30 | Cp-42 | Cp-54 |
| 3-Cl-4-CF₃-C₆H₃- | Cp-7 | Cp-19 | Cp-31 | Cp-43 | Cp-55 |
| 4-Br-2-CF₃-C₆H₃- | Cp-8 | Cp-20 | Cp-32 | Cp-44 | Cp-56 |
| 2-Br-4-CF₃-C₆H₃- | Cp-9 | Cp-21 | Cp-33 | Cp-45 | Cp-57 |
| 4-F-2-CF₃-C₆H₃- | Cp-10 | Cp-22 | Cp-34 | Cp-46 | Cp-58 |
| 2-F-4-CF₃-C₆H₃- | Cp-11 | Cp-23 | Cp-35 | Cp-47 | Cp-59 |
| 3-F-4-CF₃-C₆H₃- | Cp-12 | Cp-24 | Cp-36 | Cp-48 | Cp-60 |

TABLE 1-continued

| Ar | HO-C(=O)NH-Ar (naphthalene) | HO-C(=O)NH-Ar (NH-linked) | HO-C(=O)NH-Ar (anthracene) | HO-C(=O)NH-Ar (HN-linked) | HO-C(=O)NH-Ar (O-linked) |
|---|---|---|---|---|---|
| phenyl-C₂F₅ | Cp-61 | Cp-73 | Cp-85 | Cp-97 | Cp-109 |
| phenyl-C₃F₇ | Cp-62 | Cp-74 | Cp-86 | Cp-98 | Cp-110 |
| phenyl-C₆F₁₃ | Cp-63 | Cp-75 | Cp-87 | Cp-99 | Cp-111 |
| 2,4,6-tris(CF₃)phenyl | Cp-64 | Cp-76 | Cp-88 | Cp-100 | Cp-112 |
| 3-NO₂-4-CF₃-phenyl | Cp-65 | Cp-77 | Cp-89 | Cp-101 | Cp-113 |
| 4-OCH₃-3-CF₃-phenyl | Cp-66 | Cp-78 | Cp-90 | Cp-102 | Cp-114 |
| 4-NEt₂-2-CF₃-phenyl | Cp-67 | Cp-79 | Cp-91 | Cp-103 | Cp-115 |
| 3-CO₂CH₃-5-CF₃-phenyl | Cp-68 | Cp-80 | Cp-92 | Cp-104 | Cp-116 |
| 4-CF₂-3-CH₃-phenyl | Cp-69 | Cp-81 | Cp-93 | Cp-105 | Cp-117 |
| CF₃-naphthyl | Cp-70 | Cp-82 | Cp-94 | Cp-106 | Cp-118 |
| CF₃-benzoxazolyl-CH₃ | Cp-71 | Cp-83 | Cp-95 | Cp-107 | Cp-119 |

TABLE 1-continued

|  | Cp-72 | Cp-84 | Cp-96 | Cp-108 | Cp-120 |

Ar:

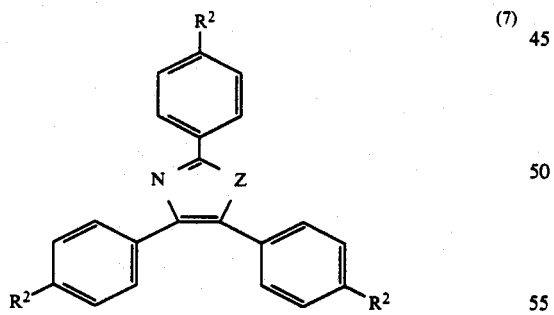

The azo compounds used in the present invention can be easily prepared by known reactions. For example, trisazo compounds of formula (2) can be prepared by the following process.

A compound of formula (7) wherein $R^2$ is a hydrogen atom and Z is the same as defined in formula (2) is nitrated, e.g., with potassium nitrate or concentrated nitric acid in concentrated sulfuric acid to prepare a compound of formula (7) wherein $R^2$ is $NO_2$. The compound thus prepared is then reduced, e.g., with iron powder and dilute hydrochloric acid or stannous chloride and hydrochloric acid in N,N-dimethylformamide to prepare a compound of formula (7) wherein $R^2$ is $NH_2$. The compound thus obtained is diazotized to form a trisdiazonium salt wherein $R^2$ is $N_2^+Q^-$ in which $Q^-$ represents an anionic functional group such as $BF_4^-$ and $ClO_4^-$ by a usual process, e.g., by reaction with sodium nitrite in dilute hydrochloric acid and then with borofluoric acid or hyperchloric acid. The resulting trisdiazonium salt is isolated and subjected to a coupling reaction in the presence of a coupler (Cp) shown in Table 1 and an alkali such as sodium acetate and sodium hydroxide in a suitable solvent such as N,N-dimethylformamide to obtain the trisazo compound of formula (2).

(7)

A compound of formula (7) wherein $R^2$ is a hydrogen atom and Z is an oxygen atom can be easily prepared by a synthesis as described in Chemische Berichte, Vol. 103, p. 1572 (1970). (J. Heinze and H. Baumgärtel). A compound of formula (2) wherein $R^2$ is a hydrogen atom and Z is a nitrogen atom can be easily prepared by a synthesis as described in Journal of the Chemical Society, Vol. 1941, p. 278 (A. H. Cook and D. G. Jones). A compound of formula (2) wherein $R^2$ is a hydrogen atom and Z is a sulfur atom or selenium atom can be easily prepared by a synthesis as described in Chemische Berichte, Vol. 103, p. 1572 (1970) (J. Heinze), Helvetica Chimica Acta, Vol. 28, p. 315 (1946), (P. Karrer and F. Forster), Jutus Liebigs Annalen der Chemie, Vol. 250, p. 294 (1889) (G. Hofman), etc.

The couplers shown in Table 1 can be easily prepared by known processes. Typical synthesis processes are shown below. However, the present invention is not limited to those synthesis processes.

A carboxylic acid of formula (8) wherein $R^3$ is —COOH and X is the same as defined in formula (1) is acid-halogenated with a suitable acid-halogenation reagent such as thionyl chloride and oxalyl chloride in an organic solvent such as benzene and chloroform to obtain a compound of formula (8) wherein $R^3$ is —CO—X' in which X' represents a chlorine atom or bromine atom. The compound thus obtained is condensed with an amine of the formula Ar—$NH_2$ (in which Ar is the same as defined in formula (1)) in an organic solvent such as acetone and methyl ethyl ketone. Thus, the couplers of the present invention can be easily prepared.

(8)

SYNTHESIS EXAMPLE 1

Synthesis of Cp-5 in Table 1

47 g (0.25 mol) of 2-hydroxy-3-naphthoic acid was mixed with 120 ml of chloroform to prepare a mixture which was then admixed with 22 ml (0.3 mol) of thionyl chloride. The liquid mixture thus obtained was heated and refluxed over an oil bath for 3 hours. After being cooled to room temperature, the solvent was removed to obtain an ocherous solid material. The solid material thus obtained was dissolved into 150 ml of acetone and then cooled to a temperature of 0° C. 107 ml (0.57 mol) of 2-amino-5-chlorobenzotrifluoride was added dropwise to the mixture. Thereafter, the reaction mixture thus obtained was heated and refluxed over an oil bath for 3 hours. After cooling to room temperature, the resulting crystals were filtered off, washed with acetone, and then recrystallized from ethanol-water to obtain 69 g (yield: 76%) of light yellow crystalline Cp-5. The melting point of the coupler was from 223.5° to 224.5° C.

SYNTHESIS EXAMPLE 2

Synthesis of a trisazo compound of formula (5), wherein Z is an oxygen atom and Cp is Cp-6 in Table 1

20 g (0.067 mol) of 2,4,5-triphenyloxazole was dissolved into 100 ml of concentrated sulfuric acid and then cooled with ice. 22.4 g (0.22 mol) of potassium nitrate was gradually added to the solution with the reaction temperature kept at a temperature of 5° C. or below. Thereafter, the reaction mixture was stirred for 3 hours while being cooled with ice. The reaction mixture was then poured into 2 l of ice water to produce a yellow precipitate which was then filtered off, washed with water, washed with ethanol, and recrystallized from pyridine to obtain 22.9 g (yield: 79%) of 2,4,5-tris(4'-nitrophenyl)oxazole.

13 g (0.03 mol) of the 2,4,5-tris(4'-nitrophenyl)oxazole was mixed with 500 ml of N,N-dimethylformamide and 26 g of iron powder. The mixture thus obtained was admixed with 10 ml of concentrated sulfuric acid and 30 ml of water, and then heated to a temperature of 100° C. with stirring. After 1 hour passed, the mixture was neutralized with a saturated aqueous solution of sodium bicarbonate with the reaction temperature kept at a temperature of 100° C. The pH of the solution after the reaction was adjusted to 8. The reaction solution was hot-filtered, and the filtrate was then poured into 3 l of ice water to produce a light yellow precipitate of 2,4,5-tris(4'-aminophenyl)oxazole which was then filtered off and dried to obtain 4.47 g of the product (yield: 97%).

12 g (0.035 mol) of the thus-obtained 2,4,5-tris(4'-aminophenyl)oxazole was added to dilute hydrochloric acid which had been prepared from 50 ml of concentrated hydrochloric acid and 100 ml of water. The mixture was heated over a 60° C. water bath with stirring, and then cooled to a temperature of 0° C. A solution of 8.0 g of sodium nitrite in 30 ml of water was added dropwise to the solution at a temperature of 0° C. in about 30 minutes. The mixture was then stirred at the same temperature for 1 hour. After small amounts of unreacted materials were filtered off, 50 ml of 42% borofluoric acid was added to the filtrate to precipitate crystals which were then filtered off. The crystals were washed with a small amount of water and dried to obtain 15.8 g (yield: 71%) of brown crystalline trisdiazonium salt.

2 g (3.13 mmol) of the thus-obtained trisdiazonium salt and 3.36 g (9.2 mmol) of 2-hydroxy-3-naphthoic acid 2'-chloro-5'-trifluoromethylanilide (Cp-6 in Table 1) as a coupler were dissolved into 100 ml of N,N-dimethylformamide and cooled to a temperature of 0° C. 10 ml of 10% aqueous solution of sodium acetate was added dropwise to the solution at a temperature of 0° C. The mixture was stirred at room temperature for 2 hours.

The resulting precipitate was filtered off, washed with 300 ml of water, washed with 200 ml of acetone, and dried to obtain 4.2 g (yield: 95%) of a trisazo compound.

The decomposition point of the compound thus obtained was 270° C. or above.

The elementary analysis value and absorption spectrum of the compound were as follows:

Elementary Analysis

Assuming that the compound is represented by formula $C_{75}H_{42}Cl_3F_9N_{10}O_7$, the following values were obtained.

Calculated Values: C, 61.17%; H, 2.87%; Cl, 7.22%; F, 11.61%; N, 9.51%

Found Values: C, 61.08%; H, 2.76%, Cl, 7.33%; F, 11.2%, N, 9.34%

IR Absorption Spectrum (KBr tablet)

Absorption of Amide: 1,680 $cm^{-1}$

Visible Absorption Spectrum

Absorption Maximum Wavelength: 572 nm (measured in 5% ethylenediamine-containing N,N-dimethylformamide)

SYNTHESIS EXAMPLE 3

Synthesis of a trisazo compound of formula (5) wherein Z is a sulfur atom and Cp is Cp-5 in Table 1

20 g (0.064 mol) of 2,4,5-triphenylthiazole was dissolved into 100 ml of concentrated sulfuric acid and cooled with ice. 21.4 g (0.212 mol) of potassium nitrate was gradually added to the solution with the reaction temperature kept at 5° C. or below. After the addition was completed, the reaction mixture was stirred for 3 hours while cooling with ice. The reaction mixture was poured into 2 l of ice water to produce a yellow precipitate which was then filtered off. The precipitate was washed with water, washed with ethanol, and recrystallized from DMF-ethanol to obtain 18.5 g (yield: 80%) of 2,4,5-tris(4'-nitrophenyl)thiazole.

15 g (0.034 mol) of the thus obtained 2,4,5-tris(4'-nitrophenyl)thiazole was mixed with 500 ml of N,N-dimethylformamide and 20 g of iron powder. The mixture was admixed with 10 ml of concentrated sulfuric acid and 30 ml of water. The admixture was heated to a temperature of 100° C. with thorough stirring. After 1 hour passed, the solution was neutralized with a saturated aqueous solution of sodium hydrogencarbonate with the reaction temperature kept at 100° C. to adjust the pH value thereof to 8. The reaction solution was then hot-filtered. The filtrate was poured into 3 l of ice water to produce a light yellow precipitate of 2,4,5-tris(4'-aminophenyl)thiazole which was then filtered off and dried to obtain 11.3 g (yield: 94%) of the product.

12 g (0.033 mol) of the thus-obtained 2,4,5-tris(4'-aminophenyl)thiazole was added to dilute hydrochloric acid which had been prepared from 60 ml of concentrated hydrochloric acid and 180 ml of water. The mixture was stirred over a 60° C. hot water bath and then cooled to a temperature of 0° C. A solution of 7.6 g of sodium nitrite in 30 ml of water was added dropwise to the solution at a temperature of 0° C. in about 30 minutes. The mixture was stirred at the same temperature for 1 hour. After small amounts of unreacted materials were filtered off, 80 ml of 42% borofluoric acid was added to the filtrate to precipitate crystals which were then filtered off. The crystals were washed with a small amount of water and dried to obtain 17.4 g (yield: 80%) of a brown crystalline trisdiazonium salt.

2 g (3.15 mmol) of the thus obtained trisdiazonium salt and 3.45 g (9.45 mmol) of 2-hydroxy-3-naphthoic acid 2'-trifluoromethyl-4'-anilide chloronaphthoicate (Cp-5 in Table 1) as a coupler were dissolved into 100 ml of N,N-dimethylformamide and cooled to a temperature of 0° C. 10 ml of 10% aqueous solution of sodium acetate was added dropwise to the solution at a temperature of 0° C. The mixture was stirred at room temperature for 2 hours.

The resulting precipitate was filtered off, washed with 300 ml of water, washed with 200 ml of acetone, and dried to obtain 4.33 g (yield: 93%) of a tetrakisazo compound.

The decomposition point of the compound thus obtained was 270° C. or above.

The elementary analysis value and absorption spectrum of the compound were as follows:

Elementary Analysis

Assuming that the compound is represented by formula $C_{75}H_{42}Cl_3F_9N_{10}O_6S$, the following values were obtained.

Calculated Values: C, 60.51%; H, 2.84%; Cl, 7.14%; F, 11.49%; N, 9.41%; S, 2.15%

Found Values: C, 60.22%; H, 3.02%, Cl, 7.01%; F, 11.45%; N, 9.46%; S, 2.09%

IR Absorption Spectrum (KBr tablet)

Absorption of Amide: 1,680 $cm^{-1}$

Visible Absorption Spectrum

Absorption Maximum Wavelength: 571 nm (measured in 5% ethylenediamine-containing N,N-dimethylformamide)

Other azo compounds of the present invention can be prepared in accordance with the above synthesis examples except in that different couplers and corresponding diazonium salts are used.

The electrophotographic photosensitive materials of the present invention have an electrophotographic photosensitive layer containing one or more azo compounds of the above general formulae. Various forms of electrophotographic photosensitive materials have been known. The electrophotographic photosensitive materials of the present invention may be in any of the known forms but usually have configurations of the types described below.

(a) Electrophotographic photosensitive materials comprising an electrically conductive support provided thereon with an electrophotographic photosensitive layer having an azo compound dispersed in a binder or an electric charge carrier transporting medium.

(b) Electrophotographic photosensitive materials comprising an electrically conductive support provided thereon with an electric charge carrier generating layer mainly comprising an azo compound on which an electric charge carrier transporting medium layer is provided.

The azo compounds of the present invention act as photoconductive materials. Those compounds generate electric charge carriers at an extremely high efficiency upon absorption of light. The electric charge carriers thus generated can be transported through those azo compounds as medium. However, it is more efficient to use an electric charge carrier transporting compound as a medium for transporting the electric charge carriers.

The electrophotographic photosensitive materials of the type (a) can be prepared by dispersing particulate azo compound into a binder solution or a solution of an electric charge carrier transporting compound and a binder, applying the dispersion onto an electrically conductive support, and then drying the coating. The thickness of the electrophotographic photosensitive layer thus prepared is generally from 3 to 30 μm, preferably from 5 to 20 μm.

The electrophotographic photosensitive materials of the type (b) can be prepared by vacuum-depositing an azo compound on an electrically conductive support, applying a solution of an azo compound in a solvent such as amine on an electrically conductive support, or applying a dispersion of particulate azo compound in a suitable solvent, or, if necessary, a solvent containing a binder dissolved therein on an electrically conductive support, drying the coating, and then applying a solution containing an electric charge carrier transporting compound and a binder onto the coating, which is then dried. The thickness of the azo compound layer as an electric charge carrier generating layer is generally 4 μm or less, and preferably 2 μm or less. The thickness of the electric charge transporting medium layer is generally from 3 to 30 μm, and preferably from 5 to 20 μm.

The azo compounds used for the photosensitive materials of the types (a) and (b) are crushed by means of a suitable dispersion mixer such as ball mill, sand mill, or vibration mill, so that the average particle diameter thereof is reduced to 5 μm or less, and preferably 2 μm or less.

If the amount of the azo compound used in the electrophotographic photosensitive materials of the type (a) is too small, the photosensitivity of the product is poor. On the contrary, if it is too large, the chargeability of the photosensitive layer is poor and the strength of the electrophotographic photosensitive layer is low. The content of the azo compound in the electrophotographic photosensitive layer is generally from 0.01 to 2 times by weight, and preferably from 0.05 to 1 time by weight, the weight of the binder. The content of the electric charge carrier transporting compound which is added to the materials as necessary is from 0.1 to 2 times by weight, and preferably from 0.3 to 1.3 times by weight, the weight of the binder. If the electric charge carrier transporting compound which can be used as a binder itself is used, the added amount of the azo compound is preferably from 0.01 to 0.5 times by weight the weight of the binder.

If an azo compound-containing layer is applied on a support to form an electric charge carrier generating layer in the electrophotographic photosensitive materials of the type (b), the amount of the azo compound used is preferably 0.1 times or more by weight the weight of the binder resin. If this amount is less than the above value, a sufficient photosensitivity cannot be obtained. The content of the electric charge carrier transporting compound in the electric charge transporting medium is generally from 0.2 to 2 times by weight, and preferably from 0.2 to 1.3 times by weight, the weight of the binder. If a high molecular weight electric charge carrier transporting compound which itself can be used as a binder is used, other binders are not necessary.

In preparation of the photosensitive materials of the type (b), an electric charge carrier transporting compound such as hydrazone compounds and oxime compounds may be added to the electric charge generating layer as described in Japanese Patent Application Nos. 53183/84, 109906/84, and 118414/84.

In preparation of the electrophotographic photosensitive materials of the present invention, additives such as plasticizer and sensitizer may be added together with the binder.

As electrically conductive support used in the electrophotographic photosensitive materials of the present invention there may be employed metal plates of aluminum, copper, zinc or the like, plastic sheet or plastic film of polyester or the like having an electrically conductive material such as aluminum, indium oxide and $SnO_2$ vacuum-deposited or dispersion-coated thereon, or paper treated with an electrically conductive material.

As the binder there may be preferably employed a hydrophobic, electrically insulating film forming high molecular weight polymer having a high dielectric constant. Examples of such a high molecular weight polymer may include the following compounds. However, the present invention is not limited to these compounds.

Polycarbonate, polyester, polyestercarbonate, methacrylate resin, acrylate resin, vinyl polychloride, vinylidene polychloride, polystyrene, polyvinylacetate, styrene-butadiene copolymer, vinylidene chloride-acrylonitrile copolymer, vinyl chloride-vinyl acetate copolymer, vinyl chloride-vinyl acetate-maleic anhydride copolymer, silicone resin, silicone-alkyd resin, phenolformaldehyde resin, styrene-alkyd resin, poly-N-vinyl-carbazole.

These binders may be used singly or in the form of a mixture of two or more such binders.

Examples of the plasticizers may include biphenyl, biphenyl chloride, o-terphenyl, p-terphenyl, dibutylphthalate, dimethylglycolphthalate, dioctylphthalate, triphenylphosphoric acid, methylnaphthalene, benzophenone, chlorinated parafinpolypropylene, polystyrene, dilaurylthiodipropionate, 3,5-dinitrosalicylic acid, and fluorohydrocarbons.

Alternatively, a silicone oil or the like may be added to improve the surface characteristics of the electrophotographic photosensitive materials.

As the sensitizers there may be employed chloranil, tetracyanoethylene, Methyl Violet, Rhodamine B, a cyanine dye, a merocyanine dye, pyrylium dye, and thiapyrylium.

Electric charge carrier transporting compounds are classified into two types of compounds, i.e., compounds for transporting electrons and compounds for transporting positive holes. The electrophotographic photosensitive materials of the present invention may employ both the two types of compounds. Examples of such electron transporting compounds include compounds having electron attracting groups, such as 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazolechloranile, 2,3-dichloro-5,6-dicyanobenzoquinone, 2,4,7-trinitro-9,10-phenanthrenequinone, tetrachlorophthalic anhydride, tetracyanoethylene, and tetracyanoquinodimethane.

Examples of the positive hole transporting compounds include compounds having electron donative groups. If such compounds are high molecular weight compounds, examples include:

(1) Polyvinylcarbazoles and derivatives thereof as described in Japanese Patent Publication No. 10966/59.

(2) Vinyl polymers such as polyvinyl pyrene, polyvinyl anthracene, poly-2-vinyl-4-(4'-dimethylaminophenyl)-5-phenyloxazole, and poly-3-vinyl-N-ethylcarbazole described in Japanese Patent Publication Nos. 18674/68 and 19192/68.

(3) Copolymers such as polyacenaphthylene, polyindene, and polymer of acenaphthylene and styrene described in Japanese Patent Publication No. 19193/68.

(4) Condensation resins such as pyreneformaldehyde resin, bromopyrene-formaldehyde resin, and ethylcarbazole-formaldehyde resin described in Japanese Patent Publication No. 13940/81.

(5) Various triphenylmethane polymers as described in Japanese Patent Application (OPI) Nos. 90883/81 and 161550/81.

If such compounds having electron donative groups are low molecular weight compounds, examples include:

(6) Triazole derivatives as described in U.S. Pat. No. 3,112,197.

(7) Oxadiazole derivatives as described in U.S. Pat. No. 3,189,447.

(8) Imidazole derivatives as described in Japanese Patent Publication No. 16096/62.

(9) Polyarylalkane derivatives described in U.S. Pat. Nos. 3,615,402, 3,820,989 and 3,542,544, Japanese Patent Publication Nos. 555/70 and 10983/76, Japanese Patent Application (OPI) Nos. 93224/76, 108667/80, 156953/80 and 36656/81.

(10) Pyrazoline derivatives and pyrazolone derivatives as described in U.S. Pat. Nos. 3,180,729 and 4,278,746, Japanese Patent Application (OPI) Nos. 88064/80, 88065/80, 105537/74, 51086/80, 80051/81, 88141/81, 45545/82, 112637/79, and 74546/80.

(11) Phenylenediamine derivatives as described in U.S. Pat. No. 3,615,404, Japanese Patent Publication No. 10105/76, Japanese Patent Application (OPI) Nos. 83435/79, 110836/79 and 119925/79, Japanese Patent Publication Nos. 3712/71 and 28336/72.

(12) Arylamine derivatives as described in U.S. Pat. No. 3,567,450, Japanese Patent Publication No. 35702/74, West German Patent (DAS) No. 1110518, U.S. Pat. Nos. 3,180,703, 3,240,597, 3,658,520, 4,232,103, 4,175,961, and 4,012,376, Japanese Patent Application (OPI) Nos. 144250/80 and 119132/81, Japanese Patent Publication No. 27577/64, and Japanese Patent Application (OPI) No. 22437/81.

(13) Benzidine derivatives as described in U.S. Pat. Nos. 4,047,948, 4,047,949, 4,265,990, 4,273,846, 4,299,897, and 4,306,008.

(14) Amino-substituted chalcone derivatives as described in U.S. Pat. No. 3,526,501.

(15) N,N-Bicarbazile derivatives as described in U.S. Pat. No. 3,542,546.

(16) Oxazole derivatives as described in U.S. Pat. No. 3,257,203.

(17) Styrylanthracene derivatives as described in Japanese Patent Application (OPI) No. 46234/81.

(18) Fluorenone derivatives as described in Japanese Patent Application (OPI) No. 110837/79.

(19) Hydrazone derivatives as described in U.S. Pat. No. 3,717,462, Japanese Patent Application (OPI) Nos. 59143/79 (corresponding to U.S. Pat. No. 4,150,987), 52063/80, 52064/80, 46760/80, 85495/80, 11350/82, 148749/82 and 104144/82.

(20) Stilbene derivatives as described in Japanese Patent Application (OPI) Nos. 190953/83, 95540/84, 97148/84, and 195658/84.

However, the electric charge carrier transporting compounds of the present invention are not limited to the above compounds (1) to (20), and any known electric charge carrier transporting compound can be employed.

These electric charge carrier transporting materials may optionally be used in any combination of two or more such materials.

The photosensitive materials thus obtained optionally may comprise an adhesive layer or a barrier layer provided interposed between the electrically conductive support and the photosensitive layer. As materials used for such an adhesive layer or barrier layer there may be employed gelatin, casein, polyvinyl alcohol, ethyl cellulose, carboxymethyl cellulose, vinylidene chloride polymer latex as described in Japanese Patent Application (OPI) No. 84247/84, styrenebutadiene polymer latex as described in Japanese Patent Application (OPI) No. 114544/84, and aluminum oxide besides the high molecular weight polymers used for the above binder. The thickness of the layers are preferably 1 μm or less.

Thus, we have discussed the electrophotographic photosensitive materials of the present invention in detail. The electrophotographic photosensitive materials of the present invention are generally characterized by high photosensitivity and excellent durability.

The electrophotographic photosensitive materials of the present invention find wide application in fields ranging from electrophotographic copying machines to printers using a laser or cathode ray tube as a light source.

The photoconductive composition containing an azo compound of the present invention can be used as a photoconductive layer for video camera tube or a photoconductive layer for solid pickup elements having a light receiving layer provided on the entire surface of a non-dimensionally or two-dimensionally arranged semiconductor circuit for performing signal transfer or scanning. The present photoconductive composition can be also used for a photoconductive layer for solar battery as described in *Journal of Applied Physics*, Vol. 49, No. 12, page 5982 (1978), by A. K. Chosh and Tom Feng.

The azo compound of the present invention can be also used as a photoconductive colored particle for photoelectrophoretic system or a colored particle for dry or wet electrophotographic developer.

The azo compound of the present invention can be used to produce a printing plate or printed circuit, e.g., as follows. The azo compound of the present invention is dispersed into an alkali-soluble resin liquid such as phenol resin together with the above electric charge carrier transporting compound such as oxadiazole derivatives and hydrazone derivatives as described in Japanese Patent Application (OPI) Nos. 19063/80, 161250/80 and 147656/82. The dispersion thus obtained is applied on an electrically conductive support such as aluminum, dried, imagewise exposed, developed with a toner, and etched with an aqueous solution of alkali to produce a printing plate or printed circuit having a high resolving power, excellent durability, and high photosensitivity.

Examples of application of the present photosensitive composition as an optical data recording medium are hereinafter described.

In particular, the optical data recording medium of the present invention can be prepared by forming an organic thin film containing at least the present azo compound on a support. Such an organic thin film can be formed of the above azo compound by various processes such as vacuum deposition and coating.

If the organic thin film is formed by coating, examples of organic solvent that can be used for the coating include alcohols such as methanol, ethanol and isopropanol, ketones such as acetone, methyl ethyl ketone, methyl isobutyl ketone and cyclohexanone, amides such as N,N-dimethylformamide and N,N-dimethylacetamide, esters such as methyl acetate, ethyl acetate and butyl acetate, ethers such as tetrahydrofuran, dioxane, monoglyme and diglyme, and halogenated hydrocarbons such as methylene chloride, chloroform, methyl chloroform, carbon tetrachloride, monochlorobenzene and dichlorobenzene. These organic solvents can be used singly or in the form of a mixture thereof. Binders for the above coloring matter may be selected from known natural or synthetic resins. Examples of such resins include cellulose resins such as nitrocellulose, cellulose phosphate, cellulose acetate, cellulose butyrate, methyl cellulose, ethyl cellulose, and butyl cellulose, acrylate resins such as polymethyl methacrylate, polybutyl methacrylate, polybutyl acrylate, polymethacrylic acid, polyacrylamide, polymethacrylamide, and polyacrylonitrile, vinyl resins such as polystyrene, vinyl polyacetate, vinyl polychloride, polyvinyl alcohol, and polyvinyl pyrrolidone, polycarbonates, polyesters, polyamide resins, epoxy resins, phenol resins, polyolefin resins such as polyethylene and polypropylene, and synthetic copolymer resins. The coating can be accomplished by means of spraying, roller coating, blade coating, and other conventional coating processes.

In forming an organic thin film with such a resin, the content of the tetrakisazo compound in the coat is generally from 5 to 90% by weight, and preferably from 15 to 80% by weight, based on the weight of the thin film thus formed. The remainder is binder. The thickness of such an organic thin film formed by vacuum deposition or by applying and drying a coating is 10 μm or less, and preferably 2 μm or less.

Such an organic thin film may optionally contain a discoloration inhibitor or coloring agent.

The materials for the support used in the present invention are known to those skilled in the art and may be transparent or opaque to laser beams used. Examples of such materials may include glass, quartz, ceramics, paper, metals, and plastics such as acrylate resin, methacrylate resin, polyester resin, polyolefin resin, polystyrene resin, polyamide resin and polycarbonate resin.

If the recording of data is performed by irradiating laser beams through the support, the support must be transparent to the laser beams. On the contrary, if the recording of data is performed by irradiating laser beams from the wrong side of the support, that is, from the side of the recording layer, the support does not need to be transparent to the laser beams. However, if the reading or reproduction of data is performed by transmitting laser beams through the layer, the support must be transparent to the laser beams. On the contrary, if the reading or reproduction of data is performed by means of reflected laser beams, the support may be transparent or opaque to the laser beams. The support may optionally be provided with guide grooves formed of indentations. Alternatively, the support may be provided with an undercoat layer comprising, for example, an ultraviolet-curing resin.

The optical data recording medium of the present invention essentially comprises an organic thin film provided on the above substrate, but may optionally comprise a reflective layer such as a vacuum-deposited or laminate layer formed of a reflective metal such as aluminum, silver, chromium, and tin interposed between the support and the organic thin film.

The recording of data on such a recording medium is performed as follows. Converged laser beams are irradiated upon the organic thin film. The resulting heat development makes pits on the organic thin film. If the depth of the pits thus formed is the same as the thickness of the organic thin film, the reflectance at the pit region can be increased. When the data is reproduced, a laser beam having the same wavelength as that used for recording, but of lower intensity than that used for recording, is used so that it is fully reflected by the pit region, but is absorbed by the other region. The difference in the intensity between the laser beams reflected by the two regions is detected. Thus, the reproduction of data is accomplished. Alternatively, a laser beam having a first wavelength which is absorbed by the organic thin film can be used for real time recording, while another laser beam having a second wavelength which is substantially transmitted through the organic thin film is used for reproduction. This process is accomplished by the phenomenon that the reproduction laser beam responds to the change of the reflective phase developed by the difference between the thickness of the pit region and the other region.

Alternatively, two sheets of recording medium having the same configuration as described above may be combined with each other with the organic thin films opposed to each other.

Such a recording medium has a protective construction in which the organic thin film is free from the air so that it can be protected against dust, scratch and hazardous gases, prolonging the shelf life thereof.

Examples of laser beams that can be used for the optical data recording medium include gas lasers such as Ar laser, He-Ne laser, and He-Cd laser.

The present invention is further illustrated by the following examples. However, the present invention is not limited to these examples.

EXAMPLE 1

1 part by weight of a trisazo compound of formula (5) in Synthesis Example 2 wherein Z is an oxygen atom, Cp is Cp-6 in Table 1 and 5 parts by weight of 4,4'-bis(-diethylamino)-2,2'-dimethyltriphenylmethane and 5 parts by weight of polycarbonate of bisphenol A were added to 95 parts by weight of dichloromethane. The mixture was crushed and mixed with each other by a ball mill to prepare a coat. The coat thus prepared was applied by means of a wire round rod on an electrically conductive transparent support which had been prepared by vacuum-depositing indium oxide on the surface of a 100 μm polyethylene terephthalate film (surface resistivity: $10^3\mu$), and dried to prepare an electrophotographic photosensitive material having a single layer type electrophotographic photosensitive layer of about 8 μm thickness.

The electrophotographic photosensitive material thus prepared was charged to +400 v by +5 kv corona discharge. The corona discharging was performed by means of a static copy paper testing apparatus made by Kawaguchi Denki K. K. (Model SP-428). The photosensitive material thus charged was irradiated by a light from a tungsten lamp having a color temperature of 2,854° K. in such a manner that the surface thereof showed an illuminance of 4 lux. The time required for the surface potential to decay to half the initial value was determined. At that time, the half exposure $E_{50}$ (lux.sec) was measured to obtain 1.6 lux.sec.

EXAMPLES 2 TO 26

Single layer type electrophotographic photosensitive materials were prepared in the same manner in Example 1, except in that azo compounds shown in Table 2 were used instead of the trisazo compounds prepared in Synthesis Example 2. These photosensitive materials were positively charged and measured for the half exposure $E_{50}$ in the same manner as used in Example 1. The results of the measurements are shown in Table 2.

The azo compounds in Table 2 are represented by combinations of Compound Nos. and Cp Nos. as indicated in Table 1.

TABLE 2

| Example No. | Compound No. | Cp No. in Table 1 | $E_{50}$ (lux · sec) |
| --- | --- | --- | --- |
| 2 | 1 | Cp-4 | 1.9 |
| 3 | 1 | Cp-7 | 2.0 |
| 4 | 1 | Cp-19 | 2.2 |
| 5 | 1 | Cp-35 | 1.8 |
| 6 | 2 | Cp-5 | 1.9 |
| 7 | 2 | Cp-8 | 1.7 |
| 8 | 2 | Cp-18 | 1.9 |
| 9 | 2 | Cp-36 | 1.8 |
| 10 | 2 | Cp-45 | 2.0 |
| 11 | 3 | Cp-30 | 2.1 |
| 12 | 3 | Cp-11 | 2.0 |
| 13 | 4 | Cp-9 | 2.2 |
| 14 | 4 | Cp-12 | 1.9 |
| 15 | 5 | Cp-29 | 1.9 |
| 16 | 5 | Cp-43 | 1.8 |
| 17 | 6 | Cp-57 | 1.7 |
| 18 | 6 | Cp-63 | 1.6 |
| 19 | 7 | Cp-78 | 1.9 |
| 20 | 7 | Cp-92 | 2.0 |
| 21 | 8 | Cp-4 | 1.9 |
| 22 | 8 | Cp-101 | 1.7 |
| 23 | 9 | Cp-5 | 1.5 |
| 24 | 10 | Cp-81 | 2.1 |
| 25 | 11 | Cp-107 | 2.0 |
| 26 | 13 | Cp-74 | 1.9 |
| 27 | 15 | Cp-5 | 1.9 |
| 28 | 15 | Cp-20 | 2.0 |
| 29 | 16 | Cp-7 | 2.2 |
| 30 | 16 | Cp-11 | 2.1 |
| 31 | 16 | Cp-30 | 2.2 |
| 32 | 17 | Cp-28 | 2.0 |
| 33 | 17 | Cp-45 | 2.3 |
| 34 | 18 | Cp-31 | 2.1 |
| 35 | 18 | Cp-80 | 2.0 |
| 36 | 19 | Cp-46 | 1.9 |
| 37 | 19 | Cp-101 | 1.8 |
| 38 | 20 | Cp-10 | 2.0 |
| 39 | 20 | Cp-92 | 2.0 |
| 40 | 21 | Cp-7 | 2.0 |
| 41 | 21 | Cp-18 | 1.9 |
| 42 | 22 | Cp-33 | 2.1 |
| 43 | 22 | Cp-55 | 2.1 |
| 44 | 23 | Cp-69 | 2.1 |
| 45 | 24 | Cp-95 | 2.0 |
| 46 | 25 | Cp-102 | 1.9 |
| 47 | 26 | Cp-119 | 1.8 |
| 48 | 27 | Cp-8 | 1.9 |
| 49 | 28 | Cp-35 | 1.9 |
| 50 | 28 | Cp-53 | 2.0 |
| 51 | 29 | Cp-64 | 2.0 |

EXAMPLE 52

5 parts by weight of a trisazo compound of formula (5) in Synthesis Example 3 wherein Z is a sulfur atom and Cp is Cp-5 in Table 1 and 5 parts by weight of a polyester resin (trademark: Byron, Toyo Boseki K. K.) were dissolved into 50 parts by weight of tetrahydrofuran. The solution was subjected to dispersion by means of a ball mill for 20 hours. The resulting coating composition was applied by a wire round rod on an electrically conductive support which had been prepared by vacuum-depositing aluminum on the surface of a 75 μm polyethylene terephthalate film (surface resistivity: $4 \times 10^2\mu$), and dried to prepare an electric charge generating layer of 0.5 μm thickness.

A solution of 3.6 parts by weight of a hydrazone compound of formula (9) shown below and 4 parts by weight of polycarbonate of bisphenol A in 13.3 parts by weight of dichloromethane and 26.6 parts by weight of 1,2-dichloroethane was applied by means of a wire round rod on the electric charge generating layer thus prepared, and dried to form an electric charge transporting layer of 11 μm thickness thereon. Thus, an electrophotographic photosensitive material having an electrophotographic photosensitive layer consisting of two layers was prepared.

trisazo compounds of formula (5) wherein Z is a sulfur atom and Cp is Cp-5 in Table 1. These photosensitive materials were subjected to the same measurements as made in Example 52. The results are shown in Table 4.

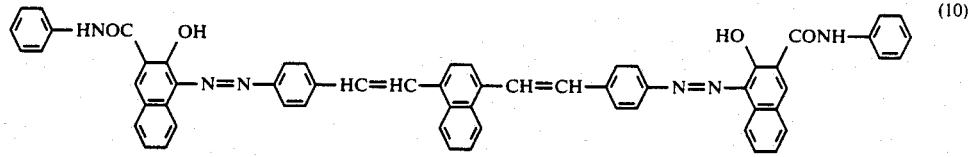

(10)

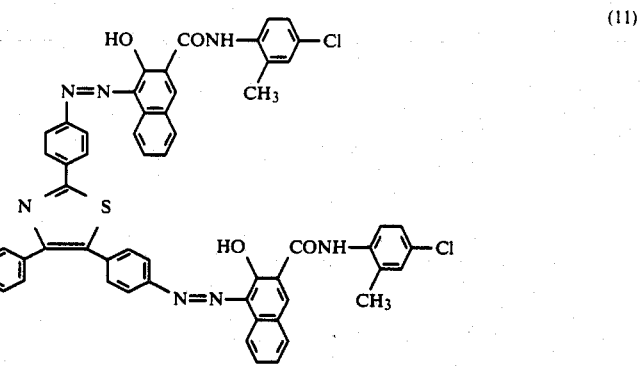

(11)

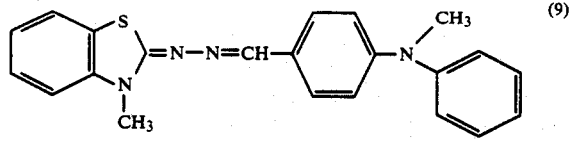

(9)

The surface potential $V_0$ of the photosensitive material thus prepared when it was charged with −6 kv corona discharge for 5 seconds was measured. Then, the surface potential $V_{30}$ of the photosensitive material after being allowed to stand in a dark room for 30 hours was measured. The photosensitive material was irradiated by a light from a tungsten lamp in such a manner that the surface thereof showed an illuminance of 30 lux. The exposure $E_{50}$ required for the surface potential to decay to half the surface potential $V_{30}$ and the surface potential $V_R$ (residual potential) when the photosensitive material was exposed to an exposure of 60 lux.sec were measured.

The above measurements were repeated 5,000 times. The results are shown in Table 3.

TABLE 3

| | 1st Measurement | 5,000th Measurement |
|---|---|---|
| $V_0$ (V) | −1,050 | −1,020 |
| $V_{30}$ (V) | −980 | −960 |
| $E_{50}$ (lux · sec) | 1.4 | 1.5 |
| $V_R$ (V) | 0 | 0 |

COMPARATIVE EXAMPLES 1 AND 2

Double layer type electrophotographic photosensitive materials were prepared in the same manner as used in Example 52 except in that compounds of formula (10) (described in Japanese Patent Application (OPI) No. 123541/83) and formula (11) (described in Japanese Patent Application (OPI) No. 30918/84) instead of the

TABLE 4

| | Comparative Example 1 | | Comparative Example 2 | |
|---|---|---|---|---|
| | 1st Measurement | 5,000th Measurement | 1st Measurement | 5,000th Measurement |
| $V_0$ (V) | −720 | −570 | −650 | −540 |
| $V_{30}$ (V) | −510 | −430 | −420 | −390 |
| $E_{50}$ (lux · sec) | 3.9 | 4.8 | 2.8 | 3.3 |
| $V_R$ (V) | −5 | −30 | −6 | −40 |

As is apparent from the above results, the electrophotographic photosensitive materials of the present invention containing azo compounds substituted by perfluoroalkyl groups (e.g., trifluoromethyl groups in Example 52) are extremely excellent in surface potential, photosensitivity, residual potential, and stability upon repeated use as compared to the electrophotographic photosensitive materials of the above comparative examples containing azo compounds which are not substituted by perfluoroalkyl groups.

EXAMPLES 53 TO 127

Double layer type electrophotographic photosensitive materials were prepared in the same manner as used in Example 52 except in that azo compounds as shown in Table 5 were used instead of the trisazo compounds prepared in Synthesis Example 3. These photosensitive materials were then subjected to the measurement of the half exposure $E_{50}$ in the same manner as in Example 52. The results are shown in Table 5.

The azo compounds in Table 5 are represented by combinations of Compound Nos. and Cp Nos. as indicated in Table 1.

TABLE 5

| Example No. | Compound No. | Cp No. in Table 1 | $E_{50}$ (lux·sec) |
|---|---|---|---|
| 53 | 1 | Cp-4 | 1.6 |
| 54 | 1 | Cp-6 | 1.5 |
| 55 | 1 | Cp-7 | 1.4 |
| 56 | 1 | Cp-9 | 1.4 |
| 57 | 1 | Cp-22 | 1.5 |
| 58 | 1 | Cp-28 | 1.5 |
| 59 | 1 | Cp-69 | 1.4 |
| 60 | 1 | Cp-101 | 1.5 |
| 61 | 2 | Cp-6 | 1.5 |
| 62 | 2 | Cp-7 | 1.5 |
| 63 | 2 | Cp-8 | 1.4 |
| 64 | 2 | Cp-9 | 1.4 |
| 65 | 2 | Cp-12 | 1.5 |
| 66 | 2 | Cp-17 | 1.6 |
| 67 | 2 | Cp-31 | 1.7 |
| 68 | 2 | Cp-81 | 1.6 |
| 69 | 2 | Cp-90 | 1.5 |
| 70 | 2 | Cp-116 | 1.6 |
| 71 | 3 | Cp-8 | 1.6 |
| 72 | 3 | Cp-40 | 1.6 |
| 73 | 3 | Cp-99 | 1.5 |
| 74 | 4 | Cp-20 | 1.7 |
| 75 | 4 | Cp-47 | 1.5 |
| 76 | 4 | Cp-64 | 1.6 |
| 77 | 5 | Cp-19 | 1.6 |
| 78 | 5 | Cp-4 | 1.5 |
| 79 | 5 | Cp-18 | 1.9 |
| 80 | 6 | Cp-7 | 1.7 |
| 81 | 6 | Cp-29 | 1.7 |
| 82 | 7 | Cp-10 | 1.8 |
| 83 | 7 | Cp-56 | 1.7 |
| 84 | 8 | Cp-20 | 1.6 |
| 85 | 8 | Cp-87 | 1.7 |
| 86 | 8 | Cp-105 | 1.6 |
| 87 | 9 | Cp-1 | 1.5 |
| 88 | 9 | Cp-5 | 1.5 |
| 89 | 9 | Cp-19 | 1.5 |
| 90 | 10 | Cp-30 | 1.8 |
| 91 | 10 | Cp-59 | 1.7 |
| 92 | 10 | Cp-78 | 1.7 |
| 93 | 11 | Cp-14 | 1.5 |
| 94 | 11 | Cp-43 | 1.5 |
| 95 | 11 | Cp-106 | 1.6 |
| 96 | 12 | Cp-61 | 1.4 |
| 97 | 12 | Cp-69 | 1.6 |
| 98 | 12 | Cp-33 | 1.6 |
| 99 | 13 | Cp-52 | 1.4 |
| 100 | 13 | Cp-72 | 1.7 |
| 101 | 14 | Cp-11 | 1.6 |
| 102 | 14 | Cp-90 | 1.6 |
| 103 | 15 | Cp-6 | 1.7 |
| 104 | 15 | Cp-30 | 1.7 |
| 105 | 16 | Cp-8 | 1.6 |
| 106 | 16 | Cp-21 | 1.7 |
| 107 | 16 | Cp-43 | 1.6 |
| 108 | 17 | Cp-11 | 1.6 |
| 109 | 17 | Cp-55 | 1.5 |
| 110 | 18 | Cp-61 | 1.5 |
| 111 | 19 | Cp-33 | 1.6 |
| 112 | 20 | Cp-20 | 1.7 |
| 113 | 20 | Cp-80 | 1.7 |
| 114 | 21 | Cp-7 | 1.5 |
| 115 | 21 | Cp-64 | 1.6 |
| 116 | 21 | Cp-74 | 1.6 |
| 117 | 22 | Cp-105 | 1.6 |
| 118 | 22 | Cp-116 | 1.7 |
| 119 | 23 | Cp-10 | 1.7 |
| 120 | 24 | Cp-32 | 1.5 |
| 121 | 25 | Cp-53 | 1.7 |
| 122 | 26 | Cp-78 | 1.7 |
| 123 | 27 | Cp-86 | 1.6 |
| 124 | 27 | Cp-8 | 1.6 |
| 125 | 28 | Cp-20 | 1.6 |
| 126 | 28 | Cp-82 | 1.5 |
| 127 | 29 | Cp-110 | 1.5 |

EXAMPLE 128

5 parts by weight of a trisazo compound of formula (5) prepared in Synthesis Example 3 wherein Z is a sulfur atom and Cp is Cp-5 in Table 1, 40 parts by weight of a hydrazone compound of formula (9) used in Example 52 and 100 parts by weight of a copolymer of benzyl methacrylate and methacrylic acid ($[\eta]30°$ C. methyl ethyl ketone=0.12, content of methacrylic acid=32.9%) were added to 660 parts by weight of dichloromethane, and ultrasonically dispersed.

The dispersion thus obtained was applied on an aluminum plate of 0.25 mm thickness which had been grained, and dried to prepare an electrophotographic photosensitive printing plate material having an electrophotographic photosensitive layer of 6 mm thickness.

The specimens were subjected to the exposure to +6 kv corona discharge in a dark room so that the surface potential of the photosensitive layer was charged to about +600 v. When the thus charged specimens were irradiated by a light from a tungsten lamp having a color temperature of 2,854° K. in such a manner that the surface thereof showed an illuminance of 2.9 lux, the half exposure was determined to be 2.0 lux.sec.

These specimens were then charged in a dark room in such a manner that the surface potential thereof reached about +400 v. The thus-charged specimens were brought into close contact with a permeable copy of positive images and then exposed to the light. These specimens were dipped into a liquid developer containing a toner which had been prepared by adding 5 parts of a dispersion of particulate polymethyl methacrylate (toner) and 0.01 part by weight of soybean oil lecithin to 1,000 parts by weight of Isopar H (a petroleum solvent manufactured by Esso Standard) to obtain a clear positive toner image.

These specimens were further heated to a temperature of 100° C. for 30 seconds to fix the toner image. These printing plate materials were dipped into a solution of 70 parts by weight of hydrated sodium metasilicate in 140 parts by weight of glycerin, 550 parts by weight of ethylene and 150 parts by weight of ethanol for about 1 minute. The materials thus treated were washed with brushing in water stream to remove the parts of the electrophotographic photosensitive layer which were free of the toner therefrom. Thus, printing plates were obtained.

On the other hand, the static latent images were magnetically developed with brushing by using Zerox 3500 toner (Fuji Zerox) instead of the above liquid developer. The specimens were then heated to a temperature of 80° C. for 30 seconds to fix the images. These specimens were treated with an alkali solution to remove therefrom the parts of the photosensitive layer which were free of toner. Thus, printing plates were likewise obtained.

The printing plates thus prepared were used for ordinary printing by a Hamada Star 600 CD offset printing machine. As a result, 50,000 sheets of clear printed matters free of stain were obtained.

EXAMPLE 129

10 g of a nitrocellulose solution (Daicel Chemical Industries, Ltd., 25 wt % solution in methyl ethyl ketone), 3.0 g of the trisazo compound prepared in Synthesis Example 2 and 100 g of tetrahydrofuran were mixed with each other and then thoroughly dispersed. The resulting dispersion was applied on an acryl substrate by a spinner coating process (at 1,000 rpm), and dried at a temperature of 80° C. for 2 hours to form a dry film of 0.3 μm thickness thereon. The recording medium thus prepared was mounted on a turntable. The recording medium was irradiated by an He-Ne laser beam having an output of 10 mW and a frequency of 8 MHz (oscillation wavelength: 633 nm) converged onto spotside 1.0 μm in diameter while the turntable was being rotated by a motor at 1,800 rpm. The irradiation of the laser beam was made in the form of track on the surface of the recording layer. An observation of the surface of the recording layer by a scanning electron microscope showed that clear pits were formed.

Furthermore, the same laser beam but with a low output was directed onto the recording medium, and the reflected light was detected. As a result, it was determined that the reflected light had a wavelength having a good S/N ratio.

COMPARATIVE EXAMPLES 3 AND 4

Double layer type electrophotographic photosensitive materials were prepared in the same manner as used in Example 52 except in that trisazo compounds of formulae (12) and (13) (as described in Japanese Patent Application (OPI) No. 30918/84) were used instead of the trisazo compounds of formula (5) wherein Z is a sulfur atom and Cp is Cp-5 in Table 1. These photosensitive materials were then subjected to the same measurements as were made in Example 52. The results are shown in Table 6.

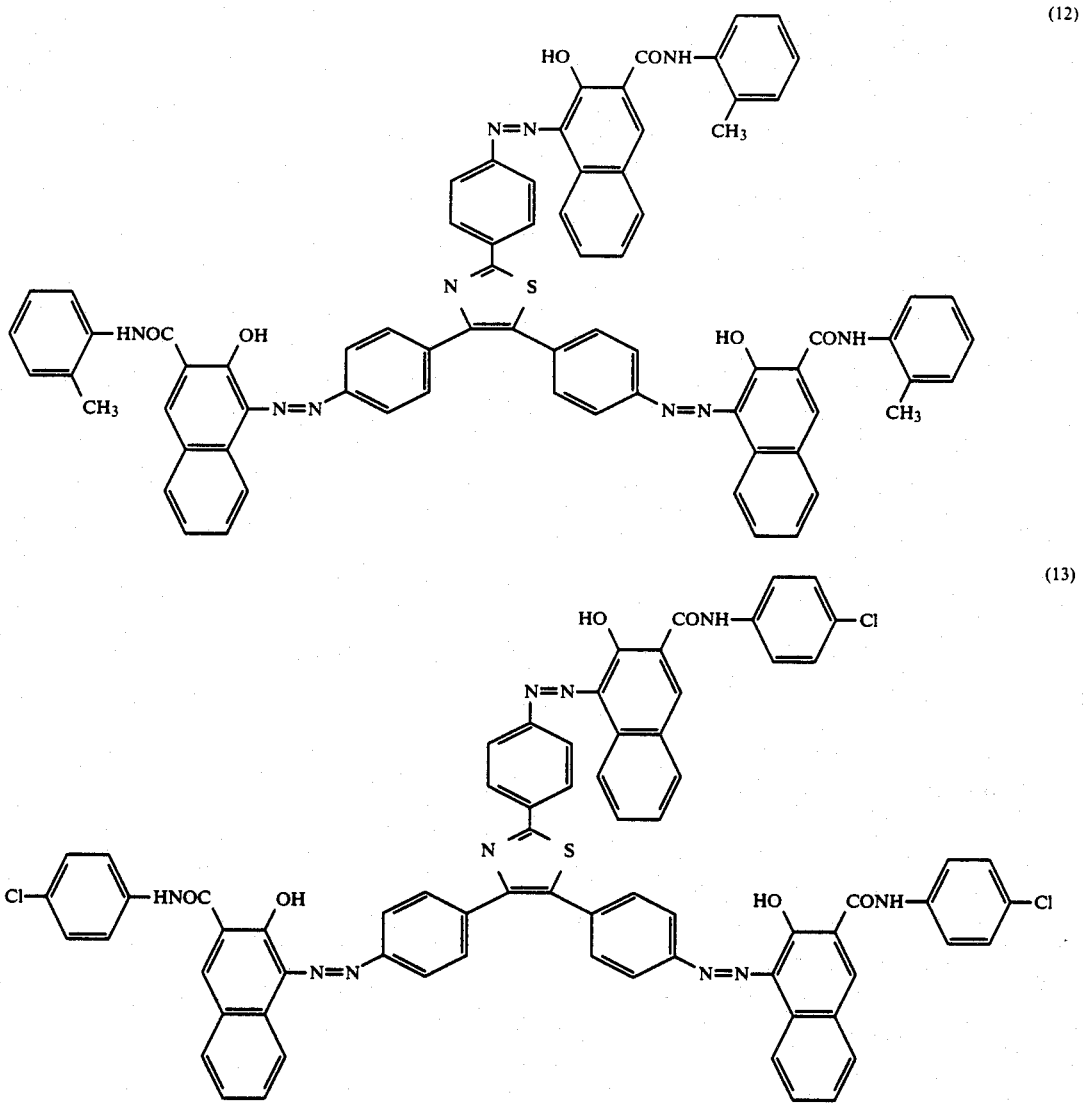

TABLE 6

| | Comparative Example 3 | | Comparative Example 4 | |
|---|---|---|---|---|
| | 1st Measurement | 5,000th Measurement | 1st Measurement | 5,000th Measurement |
| $V_0$ (V) | −550 | −490 | −520 | −460 |
| $V_{30}$ (V) | −480 | −420 | −300 | −280 |
| $E_{50}$ (lux · sec) | 3.6 | 4.0 | 2.0 | 3.1 |
| $V_R$ (V) | −10 | −55 | −5 | −20 |

As is apparent from the above results, the electrophotographic photosensitive materials of the present invention containing azo compounds substituted by perfluoroalkyl groups (trifluoromethyl groups in Example 52) and halogen atoms (halogen atoms in Example 52) are extremely excellent in surface potential, photosensitivity, residual potential, and stability upon repeated use as compared to the electrophotographic photosensitive materials of the above comparative examples containing azo compounds which are not substituted by perfluoroalkyl groups or azo compounds substituted only by halogen atoms.

While the invention has been described in detail and with reference to specific embodiments thereof, it will be apparent to one skilled in the art that various changes and modifications can be made therein without departing from the spirit and scope thereof.

What is claimed is:

1. A photosensitive composition comprising at least one azo compound represented by formula (1)

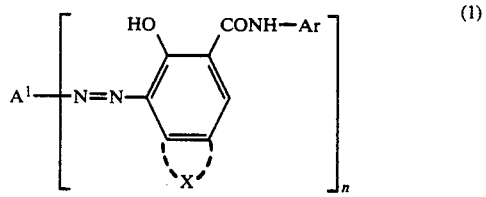

wherein $A^1$ represents a substituted or unsubstituted carbocyclic or heterocyclic aromatic ring; X represents an atomic group forming a substituted or unsubstituted carbocyclic or heterocyclic aromatic ring upon condensation with benzene rings; Ar represents a carbocyclic or heterocyclic aromatic ring substituted by at least one perfluoroalkyl group; and n represents an integer of 3, 4, 5, or 6.

2. A photosensitive composition as in claim 1, wherein Ar represents a carbocyclic or heterocyclic aromatic group substituted by at least one perfluoroalkyl group and at least one halogen atom.

3. A photosensitive composition as in claim 1, wherein said azo compound represented by formula (1) is a trisazo compound represented by formula (2)

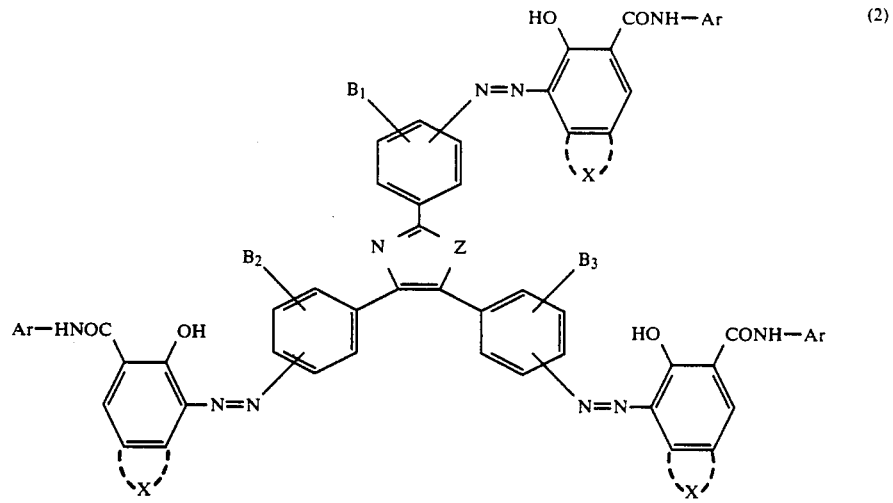

wherein Z represents $>N-R^1$, $-O-$, $-S-$ or $-Se-$ in which $R^1$ represents a hydrogen atom, lower alkyl group, aryl group, alkoxycarbonyl group, aryloxycarbonyl group, acyl group, or a derivative thereof; X represents an atomic group forming a substituted or unsubstituted carbocyclic or heterocyclic aromatic ring upon condensation with benzene rings; Ar represents a carbocyclic or heterocyclic atomatic ring substituted by at least one perfluoroalkyl group; and $B^1$, $B^2$, and $B^3$ each represents a hydrogen atom, halogen atom, lower alkyl group, lower alkoxy group, or a derivative thereof.

4. A photosensitive composition as in claim 1, wherein the azo compound represented by formula (1) is a tetrakisazo compound represented by formula (3)

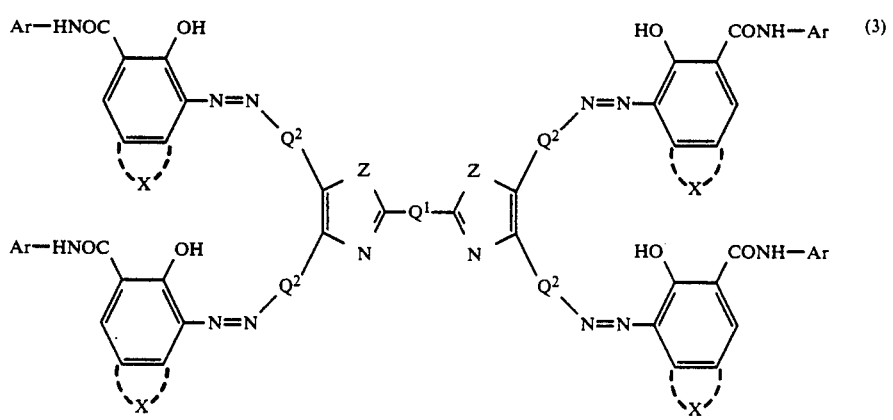

wherein Z represents >N—R¹, —O—, —S—, or —Se— in which R¹ represents a hydrogen atom, lower alkyl group, aryl group, alkoxycarbonyl group, aryloxycarbonyl group, acyl group or a derivative thereof; X represents an atomic group forming a substituted or unsubstituted carbocyclic or heterocyclic aromatic ring upon condensation with benzene rings; Ar represents a carbocyclic or heterocyclic aromatic ring substituted by at least one perfluoroalkyl group; $Q^1$ represents a single bond,

in which n represents an integer of 1 to 3, or divalent organic residue group having aromatic properties ($B^1$ and $B^2$ each represents a hydrogen atom or electron withdrawing group); and $Q^2$ represents a divalent carbocyclic or heterocyclic aromatic group or a derivative thereof.

5. A photosensitive composition as in claim 1, wherain said azo compound represented by formula (1) is a trisazo compound represented by formula (4)

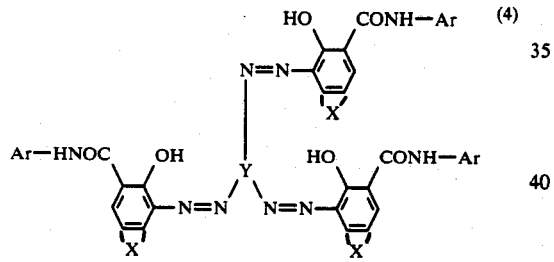

wherein Y represents

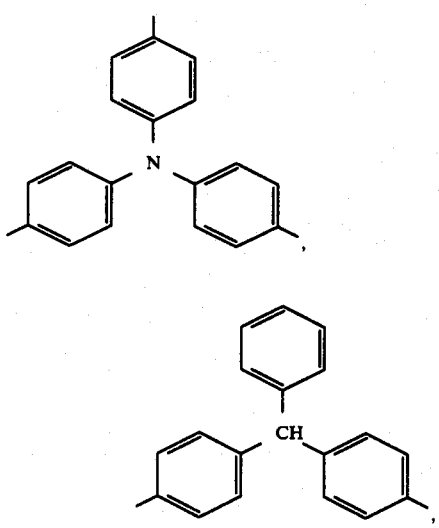

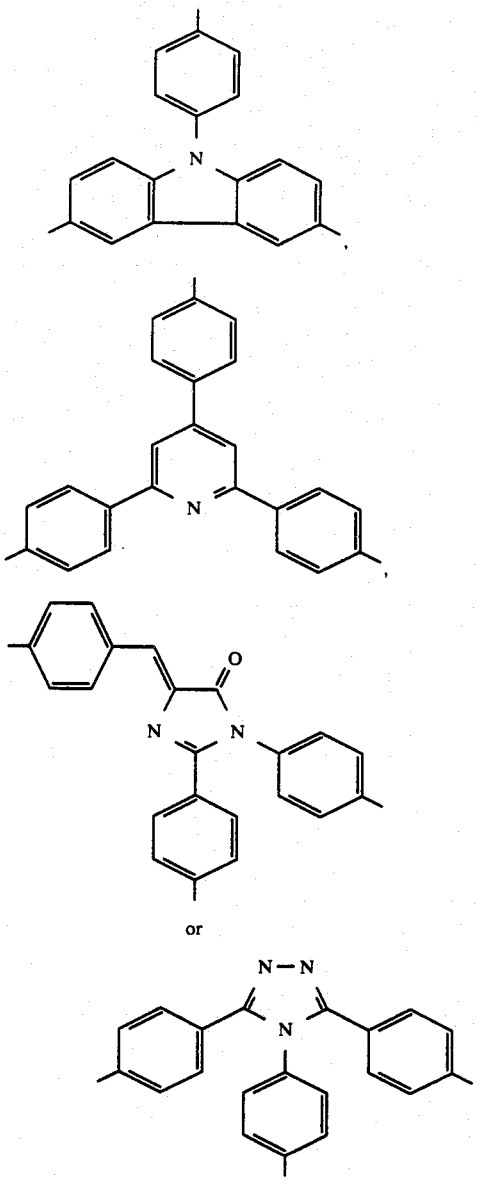

X represents an atomic group forming a substituted or unsubstituted carbocyclic or heterocyclic aromatic ring upon condensation with benzene rings; and Ar represents a carbocyclic or heterocyclic aromatic ring substituted by at least one perfluoroalkyl group.

6. A photosensitive composition as in claim 1, wherein X represents a group which can form a naphthalene ring, an anthracene ring, a carbazole ring, a benzocarbazole ring or a dibenzofuran ring upon condensation with benzene rings to which hydroxy groups are bonded.

7. A photosensitive composition as in claim 1, wherein Ar represents benzene or naphthalene each having at least one perfluoroalkyl group.

8. A photosensitive composition as in claim 7, wherein said perfluoroalkyl group is a trifluoromethyl group.

9. A photosensitive composition as in claim 2, wherein said perfluoroalkyl group is a trifluoromethyl group and said halogen atom is fluorine, chlorine or bromine.

10. A photosensitive composition as in claim 2, wherein Ar represents benzene or naphthalene each having at least one perfluoroalkyl group and at least one halogen atom.

* * * * *